(12) United States Patent
Johnson et al.

(10) Patent No.: US 10,664,348 B2
(45) Date of Patent: May 26, 2020

(54) FAULT RECOVERY MANAGEMENT IN A CLOUD COMPUTING ENVIRONMENT

(71) Applicant: Microsoft Technology Licensing, LLC, Redmond, WA (US)

(72) Inventors: James E. Johnson, Bellevue, WA (US); Mark Russinovich, Hunts Point, WA (US)

(73) Assignee: Microsoft Technology Licensing LLC, Redmond, WA (US)

( * ) Notice: Subject to any disclaimer, the term of this patent is extended or adjusted under 35 U.S.C. 154(b) by 124 days.

(21) Appl. No.: 16/048,259

(22) Filed: Jul. 28, 2018

(65) Prior Publication Data
US 2018/0365108 A1 Dec. 20, 2018

Related U.S. Application Data

(63) Continuation of application No. 15/220,320, filed on Jul. 26, 2016, now Pat. No. 10,061,652.

(51) Int. Cl.
*G06F 11/00* (2006.01)
*G06F 11/14* (2006.01)
(Continued)

(52) U.S. Cl.
CPC ........ *G06F 11/142* (2013.01); *G06F 11/0709* (2013.01); *G06F 11/2033* (2013.01);
(Continued)

(58) Field of Classification Search
CPC . G06F 11/0709; G06F 11/142; G06F 11/2033
See application file for complete search history.

(56) References Cited

U.S. PATENT DOCUMENTS

| 6,567,937 B1 | 5/2003 | Flores et al. |
| 7,827,282 B2 | 11/2010 | Sorrentino et al. |

(Continued)

OTHER PUBLICATIONS

"2—Hosting a Multi-Tenant Application on Windows Azure", retrieved from <<https://msdn.microsoft.com/en-us/library/hh534478.aspx>>, Published on: Dec. 14, 2012, 15 pages (submitted in parent U.S. Appl. No. 15/220,320, filed Jul. 26, 2016).

(Continued)

*Primary Examiner* — Charles Ehne
(74) *Attorney, Agent, or Firm* — Ogilvie Law Firm

(57) ABSTRACT

Technologies for managing fault recovery in a cloud computing environment may be used after faults of various sizes, including faults which put total functioning capacity below subscribed capacity. Computing services have repair priorities. A fault recovery manager selects a higher priority service whose capacity is below a minimum availability, and chooses a lower priority service still above its minimal availability, and reassigns capacity from the lower priority service to the higher priority service without depriving the lower priority service of operability. Capacity reassignment continues at least until the higher priority service is at or above minimal availability, or the lower priority service is at minimal availability. Lower priority services may also be terminated entirely to free up resources for higher priority services. New deployments may be prevented until all services are at or above minimal availability. Spare capacity may be reserved against demand fluctuations or further faults.

20 Claims, 6 Drawing Sheets

(51) Int. Cl.
*H04L 29/08* (2006.01)
*G06F 11/07* (2006.01)
*G06F 11/20* (2006.01)
*G06F 11/34* (2006.01)

(52) U.S. Cl.
CPC ...... *H04L 67/1008* (2013.01); *G06F 11/3442* (2013.01); *G06F 2201/805* (2013.01); *G06F 2201/85* (2013.01)

(56) References Cited

U.S. PATENT DOCUMENTS

| | | | |
|---|---|---|---|
| 8,055,933 | B2 | 11/2011 | Jaehde et al. |
| 8,631,283 | B1 | 1/2014 | Sivasubramanian et al. |
| 8,677,174 | B2 | 3/2014 | Bobak et al. |
| 8,694,822 | B2 | 4/2014 | Radhakrishnan |
| 8,751,857 | B2 | 6/2014 | Frenkel et al. |
| 8,775,648 | B1 | 7/2014 | Cassidy et al. |
| 8,819,476 | B2 | 8/2014 | Roth et al. |
| 9,009,521 | B2 | 4/2015 | Jaisinghani |
| 2005/0283636 | A1 | 12/2005 | Vasudevan et al. |
| 2007/0174361 | A1 | 7/2007 | Branda et al. |
| 2008/0256384 | A1 | 10/2008 | Branson et al. |
| 2010/0083034 | A1 | 4/2010 | Tamura |
| 2010/0325473 | A1 | 12/2010 | Agneeswaran et al. |
| 2011/0055838 | A1 | 3/2011 | Moyes |
| 2011/0154349 | A1 | 6/2011 | Walton et al. |
| 2012/0072571 | A1 | 3/2012 | Orzell et al. |
| 2012/0246638 | A1 | 9/2012 | He et al. |
| 2013/0111035 | A1 | 5/2013 | Alapati et al. |
| 2013/0227334 | A1 | 8/2013 | Wang |
| 2013/0227349 | A1* | 8/2013 | Nodir ................. G06F 11/0709 714/37 |
| 2013/0305083 | A1* | 11/2013 | Machida ............... G06F 11/008 714/4.1 |
| 2014/0059542 | A1 | 2/2014 | Ashok et al. |
| 2014/0149784 | A1 | 5/2014 | Ngo et al. |
| 2014/0189130 | A1 | 7/2014 | Khandelwal et al. |
| 2014/0215259 | A1 | 7/2014 | Crabtree, Jr. et al. |
| 2015/0319053 | A1 | 11/2015 | Huang et al. |
| 2016/0034355 | A1 | 2/2016 | Sadovsky et al. |
| 2016/0321115 | A1 | 11/2016 | Thorpe et al. |
| 2018/0020077 | A1 | 1/2018 | Folco et al. |

OTHER PUBLICATIONS

Srinivas, et al., "A Study on Cloud Computing Disaster Recovery", in International Journal of Innovative Research in Computer and Communication Engineering, vol. 1, Issue 6, Aug. 2013, pp. 1380-1389. (submitted in parent U.S. Appl. No. 15/220,320, filed Jul. 26, 2016).
Wiselman, Rayne., "Business continuity and disaster recovery (BCDR): Azure Paired Regions", retrieved from <<https://azure.microsoft.com/en-in/documentation/articles/best-practices-availability-paired-region>>, retrieved on Jan. 29, 2016, 6 pages. (submitted in parent U.S. Appl. No. 15/220,320, filed Jul. 26, 2016).
Wood, et al., "Disaster Recovery as a Cloud Service: Economic Benefits & Deployment Challenges", In Proceedings of the 2nd USENIX conference on Hot topics in cloud computing, Jun. 22, 2010, pp. 1-7. (submitted in parent U.S. Appl. No. 15/220,320, filed Jul. 26, 2016).
"Distributed Virtual Data Center for Enterprise and Service Provider Cloud", in White Paper by Cisco, Mar. 19, 2014, pp. 1-34. (submitted in parent U.S. Appl. No. 15/220,320, filed Jul. 26, 2016).
Wolloch, URI., "Enterprise-class EC2 Backup and Disaster Recovery", retrieved from <<http://www.n2ws.com/blog/ec2_disaster_recovery.html>>, Published May 18, 2013, 4 pages. (submitted in parent U.S. Appl. No. 15/220,320, filed Jul. 26, 2016).
"How to Design a Disaster Recovery Plan", retrieved from <<https://cloud.google.com/solutions/designing-a-disaster-recovery-plan>>, Published Sep. 8, 2015, 10 pages. (submitted in parent U.S. Appl. No. 15/220,320, filed Jul. 26, 2016).

Robinson, et al., "Using Amazon Web Services for Disaster Recovery", in whitepaper from Amazon Web Services, Oct. 2014, pp. 1-22. (submitted in parent U.S. Appl. No. 15/220,320, filed Jul. 26, 2016).
Wickline, "Azure Business Continuity Technical Guidance", retrieved from <<https://msdn.microsoft.com/en-us/library/azure/hh873027.aspx>>, May 13, 2016, 3 pages. (submitted in parent U.S. Appl. No. 15/220,320, filed Jul. 26, 2016).
Myers, Tamra, "Azure Storage Redundancy Options", retrieved from <<https://msdn.microsoft.com/en-us/library/azure/dn727290.aspx>>, Apr. 10, 2015, 5 pages. (submitted in parent U.S. Appl. No. 15/220,320, filed Jul. 26, 2016).
"Infosys—Business Technology Consulting", retrieved from <<https://www.infosys.com/>>, Retrieved on Feb. 5, 2016, 1 page. (submitted in parent U.S. Appl. No. 15/220,320, filed Jul. 26, 2016).
Zander, Jason, "Final Root Cause Analysis and Improvement Areas: Nov 18 Azure Storage Service Interruption", retrieved from <<https://azure.microsoft.com/en-us/blog/final-root-cause-analysis-and-improvement-areas-nov-18-azure-storage-service-interruption/>>, Published on: Dec. 17, 2014, 8 pages (submitted in parent U.S. Appl. No. 15/220,320, filed Jul. 26, 2016).
Zander, Jason, "Update on Azure Storage Service Interruption", retrieved from <<https://azure.microsoft.com/en-us/blog/update-on-azure-storage-service-interruption/>>, Published on Nov. 19, 2014, 5 pages (submitted in parent U.S. Appl. No. 15/220,320, filed Jul. 26, 2016).
Laing, Bill, "Summary of Windows Azure Service Disruption on Feb. 29, 2012", retrieved from <<https://azure.microsoft.com/en-us/blog/summary-of-windows-azure-service-disruption-on-feb-29th-2012/>>, Published on Mar. 9, 2012, 12 pages (submitted in parent U.S. Appl. No. 15/220,320, filed Jul. 26, 2016).
Neil, Mike, "Details of the Feb. 22, 2013 Windows Azure Storage Disruption", retrieved from <<https://azure.microsoft.com/en-us/blog/details-of-the-february-22nd-2013-windows-azure-storage-disruption/>>, Published on Mar. 1, 2013, 7 pages (submitted in parent U.S. Appl. No. 15/220,320, filed Jul. 26, 2016).
"AWS Regions and Endpoints—Amazon Web Services", retrieved from <<http://docs.aws.amazon.com/general/latest/gr/rande.html>>, Retrieved on Feb. 5, 2016, 41 pages (submitted in parent U.S. Appl. No. 15/220,320, filed Jul. 26, 2016).
Bindal, Shivan, "AWS Reboot: FAQs", retrieved from <<http://www.rightscale.com/blog/rightscale-news/aws-reboot-faqs#What is the specific timing and will all my impacted instances be rebooted at once?>>, Published on Sep. 25, 2014, 8 pages (submitted in parent U.S. Appl. No. 15/220,320, filed Jul. 26, 2016).
"Regions and Zones—Google Cloud Platform", retrieved from <<https://cloud.google.com/compute/docs/zones>>, Retrieved on Feb. 5, 2016, 8 pages (submitted in parent U.S. Appl. No. 15/220,320, filed Jul. 26, 2016).
Kerner, et al., "Simultaneous Instance Maintenance across Zones & Regions?", retrieved from <<https://groups.google.com/forum/?utm_medium=email&utm_source=footer#!msg/gce-discussion/iQ_4vtEHoME/z1ilwq7HNXAJ>>, Published on Dec. 29, 2014, 1 page (submitted in parent U.S. Appl. No. 15/220,320, filed Jul. 26, 2016).
"Service-level agreement", retrieved from <<https://en.wikipedia.org/wiki/Service-level_agreement>>, Apr. 7, 2016, 6 pages (submitted in parent U.S. Appl. No. 15/220,320, filed Jul. 26, 2016).
"Cloud computing", retrieved from <<https://en.wikipedia.org/wiki/Cloud_computing>>, May 8, 2016, 19 pages (submitted in parent U.S. Appl. No. 15/220,320, filed Jul. 26, 2016).
"Upgrading AlwaysOn Availability Group Replica Instances", retrieved from <<https://msdn.microsoft.com/en-us/library/dn178483.aspx>>, Mar. 1, 2016, 6 pages (submitted in parent U.S. Appl. No. 15/220,320, filed Jul. 26, 2016).
"Azure Exam Prep—Fault Domains and Update Domains", retrieved from <<https://blogs.msdn.microsoft.com/plankytronixx/2015/05/01/azure-exam-prep-fault-domains-and-update-domains/>>, May 1, 2015, 10 pages (submitted in parent U.S. Appl. No. 15/220,320, filed Jul. 26, 2016).

(56) References Cited

OTHER PUBLICATIONS

"Regions and Availability Zones—Amazon Elastic Compute Cloud", retrieved from <<http://docs.aws.amazon.com/AWSEC2/latest/UserGuide/using-regions-availability-zones.ht . . . >>, Retrieved on Feb. 18, 2016, 11 pages (submitted in parent U.S. Appl. No. 15/220,320, filed Jul. 26, 2016).

"AWS Regions and Endpoints—Amazon Web Services", retrieved from <<http://docs.aws.amazon.com/general/latest/gr/rande.html>>, Retrieved on Jan. 22, 2016, 42 pages (submitted in parent U.S. Appl. No. 15/220,320, filed Jul. 26, 2016).

Myers, "Azure Storage replication", retrieved from <<https://azure.microsoft.com/en-us/documentation/articles/storage-redundancy/>>, Jan. 5, 2016, 4 pages (submitted in parent U.S. Appl. No. 15/220,320, filed Jul. 26, 2016).

"Azure Business Continuity Technical Guidance", retrieved from <<https://msdn.microsoft.com/en-us/library/azure/hh873027.aspx>>, Mar. 26, 2015, 34 pages (submitted in parent U.S. Appl. No. 15/220,320, filed Jul. 26, 2016).

Kerner, et al., "Microsoft Azure Regional Strategy: Availability, DR, Proximity, and Residency", presentation, May 5, 2015, 19 slides (submitted in parent U.S. Appl. No. 15/220,320, filed Jul. 26, 2016).

"Top 10 Data Center Disasters that could ruin your business", retrieved from <<http://www.teamsilverback.com/top-10-data-center-disasters-that-could-ruin-your-business/>>, Jun. 1, 2014, 3 pages (submitted in parent U.S. Appl. No. 15/220,320, filed Jul. 26, 2016).

"Summary of the Oct. 22, 2012 AWS Service Event in the US—East Region", retrieved from <<https://aws.amazon.com/message/680342/>>, no later than Jun. 2, 2016, 9 pages (submitted in parent U.S. Appl. No. 15/220,320, filed Jul. 26, 2016).

Wiselman, et al., "Replicate Hyper-V virtual machines in VMM clouds to a secondary VMM site", retrieved from <<https://azure.microsoft.com/en-us/documentation/articles/site-recovery-vmm-to-vmm/>>, Feb. 17, 2016, 27 pages (submitted in parent U.S. Appl. No. 15/220,320, filed Jul. 26, 2016).

Roth, et al., "Active Geo-Replication for Azure SQL Database", retrieved from <<https://azure.microsoft.com/en-us/documentation/articles/sql-database-geo-replication-overview/>>, Mar. 7, 2016, 6 pages (submitted in parent U.S. Appl. No. 15/220,320, filed Jul. 26, 2016).

Lin, et al., "Enable diagnostics logging for web apps in Azure App Service", retrieved from <<https://azure.microsoft.com/en-us/documentation/articles/web-sites-enable-diagnostic-log/>>, Jan. 6, 2016, 16 pages. (submitted in parent U.S. Appl. No. 15/220,320, filed Jul. 26, 2016).

"Introduction to Oracle Internet Application Server", retrieved from <<https://docs.oracle.com/cd/A97339_01/doc/ias.100/a83709/ias.htm>>, Apr. 11, 2014, 4 pages (submitted in parent U.S. Appl. No. 15/220,320, filed Jul. 26, 2016).

"Testing for availability", retrieved from <<https://books.google.co.in/books?id=DwoZBQAAQBAJ&pg=PA76&lpg=PA76&dq=#v=onepage&q&f=false>>, Oct. 13, 2014, 1 page (submitted in parent U.S. Appl. No. 15/220,320, filed Jul. 26, 2016).

Fu, et al., "Recovery for Failures in Rolling Upgrade on Clouds", In Proceedings of 44th Annual IEEE/IFIP International Conference on Dependable Systems and Networks, Jun. 23, 2014, 6 pages (submitted in parent U.S. Appl. No. 15/220,320, filed Jul. 26, 2016).

* cited by examiner

FAULT RECOVERY MANAGEMENT IN A CLOUD COMPUTING ENVIRONMENT

RELATED APPLICATION

The present application claims priority to, is a continuation of, and incorporates by reference the entirety of, U.S. patent application Ser. No. 15/220,320 filed 26 Jul. 2016.

BACKGROUND

A cloud computing environment, also called a "cloud environment" or simply a "cloud", provides shared processing resources on demand over at least one network. Often, but not always, the cloud computing environment is accessed over the Internet. The cloud's users are often called "guests" or "tenants".

In the absence of hardware failures and other faults, the processing resources provided by the cloud computing environment are generally available on demand from shared pools of configurable computing resources such as networks, servers, storage devices, applications, and software services, and the offered resources can be rapidly provisioned and released with relatively small management effort from the users. A cloud environment's computing and storage solutions provide the cloud's users with varied and flexible capabilities to store and process their data in third-party datacenters. Faults that limit the available computing resources may impact a single server, or a rack of servers, or even in some cases an entire datacenter, for example.

Some cloud providers offer an "Infrastructure-as-a-Service" (IaaS), which includes offering the use of computers, either "bare metal" physical computers or (more often) virtual machines. IaaS services generally spare the cloud's tenants from dealing with details of infrastructure such as the physical location of a server within a datacenter, the data partitioning and replication locations used, and the administrative details of computational resource scaling, by hiding those details from the tenants. IaaS tenants can develop and run their software solutions on the IaaS cloud platform without the cost and complexity of buying and managing the underlying hardware. A hypervisor may run the virtual machines on behalf of the tenants, which can often allow one or more operating systems within respective virtual machines to share a single hardware host. In the absence of large faults (e.g., non-functionality of an entire datacenter), hypervisors within the cloud can generally support many virtual machines and can scale the offered services up and down, according to tenants' varying requirements. To deploy their applications in the cloud, tenants install their own operating system images on top of the cloud's virtual machines, then install their application software on top of the operating systems. In an IaaS model, each tenant is responsible both for updates to the operating systems and for updates to the application software the tenant runs.

Some cloud providers offer a "Platform-as-a-Service" (PaaS), which includes offering a development environment to application developers. PaaS services generally spare the cloud's tenants from dealing with infrastructure details required for installing and updating operating system images, by hiding those details from the tenants. Thus, a PaaS offering may run on top of one or more IaaS offerings. The PaaS provider typically offers toolkits and standards for software development and may offer channels for software distribution and for licensing or subscription payments. A PaaS provider generally provides tenants with a computing platform, typically including an operating system, one or more programming language execution environments, database services, and/or web services. Application developers can develop and run their software solutions on the PaaS cloud platform without the cost and complexity of buying and managing the underlying hardware and software. With some PaaS offerings, the underlying computer and storage resources can scale automatically to match application demand so that the cloud tenant does not have to allocate those resources manually.

SUMMARY

Some technologies described herein are directed to the technical activity of managing fault recovery in a cloud computing environment. Some are directed in particular to managing fault recovery by reassigning capacity when a cloud's current functional capacity is less than its subscribed capacity; this may occur, for instance, when disasters or other catastrophic events make large amounts of capacity non-functional. Other technical activities pertinent to teachings herein will also become apparent to those of skill in the art.

In some embodiments, computing services have repair priorities. When total functional capacity is less than the capacity of the subscribed computing services, or at other times, priorities and minimal availability information guide reassignments of capacity. One embodiment selects a higher priority computing service which has a current assigned capacity that is below a minimal availability threshold of the higher priority computing service. The higher priority computing service also has a repair priority. A lower priority computing service, which has a repair priority that is lower than the higher priority computing service's repair priority, is chosen. The lower priority computing service also has a current assigned capacity that is above a minimal availability threshold of the lower priority computing service.

In this context, capacity is reassigned from the lower priority computing service to the higher priority computing service, without necessarily depriving the lower priority computing service of operability. Capacity is reassigned by reducing the current assigned capacity of the chosen lower priority computing service, thereby freeing for reassignment at least a portion of at least one computational resource of the cloud computing environment, and then increasing the assigned capacity of the higher priority computing service, thereby reassigning at least part of the freed computational resource.

Such capacity reassignment continues at least until one of the following conditions occurs: (i) the assigned capacity of the higher priority computing service is no longer below the minimal availability threshold of the higher priority computing service, (ii) the assigned capacity of the higher priority computing service is at least a subscribed capacity of the higher priority computing service, or (iii) further reducing would put the assigned capacity of the lower priority computing service below the minimal availability threshold of the lower priority computing service. If a selected lower priority service cannot by itself yield enough capacity to bring the higher priority service up to minimal availability, then capacity may also be reassigned to the higher priority service from one or more additional lower priority services without sacrificing their operability. But if that is still not sufficient, lower priority services may also be terminated entirely to free up resources for the higher priority service.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
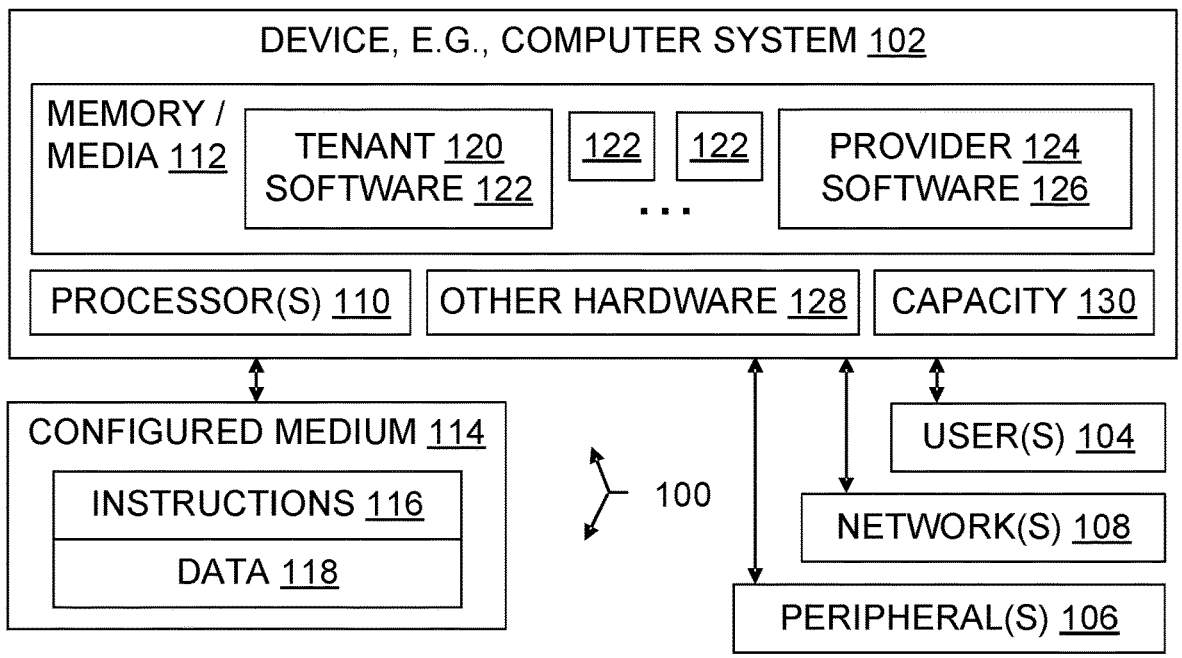
FIG. 1 is a block diagram illustrating a cloud computer system having at least one processor and at least one memory which interact with one another under the control of software, and also illustrating some configured storage medium examples.

Many cloud systems today provide automatic recovery of their users' virtual machines (VMs) or computing services. This is often driven by familiar declarative policies in a service definition. Typical policies include the percentage of a set of services that can be at risk from any typical single failure, as well as how quickly to issue a repair that includes an operation such as moving an instance of the service, restarting the instance, rebooting the underlying blade, or reinstalling the host system on the underlying blade, for example. A controller will attempt a sequence of operations to repair a service, with each subsequent part of the sequence often being either more expensive to execute or more damaging to the service's apparent availability than prior parts of the sequence. The service definition provides parameters that guide how aggressively the controller is to move through the repair sequence.

A repair may include a mesh of actions. For instance, the basic policy might be try to restart the service, then if that fails try to reboot the blade, and if that fails move the service. But the service may specify in its configuration that it strongly wants to be restarted, so what may actually happen is that the restart is tried more than once. If the first restart fails, then the reboot is initiated and the controller also begins placing a copy of the service on another node. The first one of these two efforts (reboot, restart via copy) that reaches completion wins, and that determines where the service ends up.

Implicit in these policies is an assumption that the original service can be returned to full functionality. In other words, if it started with a hundred working instances, then after a failure in the underlying hardware, it will be restored to a hundred working instances. These working instances may include whatever structure(s) the service is based on. They could be VM instances, operating system instances, or application process instances, for example.

To support this recovery, cloud systems in cloud computing environments 100 often hold in reserve additional hardware capacity that will be reallocated in the event of hardware failures. The reserve capacity is typically enough to restore full functionality to services in the event of "typical" hardware failures. The set of hardware that would be impacted by the most severe typical hardware failure is collected into a fault domain 1008.

A hardware failure of a component is considered "typical" when the cause of failure is in the failed component itself. Typical hardware failures are statistically predictable based on the component's MTTF (mean time to failure). By contrast, hardware failure of a component 1006 is atypical when it is caused by something outside the failed component, e.g., a natural disaster, act of war, act of terrorism, or sabotage. The "component" in this definition may be an individual device such as a hard drive 128, or the component 1006 may be a group of devices that share a single point of failure such as the servers 1002 and hard drives in a rack 1004 that share a power supply. One way to identify a fault domain 1008 is to look at the hardware and environmental contributors, and organize them by the impact that their failure would have (a disk on a blade impacts that disk, a top-of-rack switch or other shared component on a rack 1004 impacts all the blades in that rack) and the odds that the failure will happen. This produces a curve, and a knee in that curve corresponds to a fault domain. For some cloud infrastructure, this almost always identifies a rack as a fault domain. One can have multidimensional fault domains, but the logic still holds: the fault domain is the largest collection of components that is likely to see a correlated failure.

To amortize the cost of this reserve, hardware in the reserve may be offered for use by services in a transient state where no repair targets are offered to the services. This is a second typical type of service, at the opposite extreme in availability support from the first.

The familiar approaches described above miss an important scenario: they lack policies for handling larger and more unusual failures that exceed the reserve hardware, to guide allocation of resources as repair is attempted for the services that expect to be repaired. As terminology, the set of hardware impacted by a single large failure may be collected into an availability zone 252. One or more availability zones 252 may in turn constitute a region 250. An "availability zone" is a set of one or more datacenter 256 groups within a single country which cannot be entirely removed from service by a typical hardware failure; only atypical causes of failure such as natural disasters, acts of war, acts of terrorism, bankruptcy, massive changes in society, or sabotage can remove an entire availability zone from service.

For instance, while a cloud vendor may hold in reserve enough capacity to transparently handle the loss of a rack 1004, it will not conventionally hold in reserve enough capacity within the immediate area around a datacenter (DC) 256 to transparently handle the loss of that DC; often DCs are grouped in a metro area or a campus, and transparently handling that DC loss would require moving the workload within that group. "Transparently" in this case means that the service does not see an interruption that exceeds the stated SLO or SLA commitments. There may be a small outage, but it is repaired within a normal short timeframe. The user may or may not be notified of the interruption. A "datacenter" 256 is a single building or other walled enclosure and the systems within it which provide computing processors or data storage or both. A datacenter may have redundant power and network connections, but it is still subject to a single building failure, e.g. a fire. A "datacenter group" 257 (also called a "campus") is a set of datacenters situated within a few milliseconds of network latency or otherwise close enough physically to one another that users do not see noticeable differences in performance based on which datacenter in the group they end up using. For example, a datacenter group 257 may be a set of one or more datacenters 256 that are owned or operated in common with one another and are interconnected by one or more networks whose aggregated speed is at least 80 Mbps. Datacenters within a given group are isolated from one another with respect to fire and datacenter power and network interruption, but not necessarily with respect to floods, hurricanes, earthquakes, meteor impacts, or other large natural disasters, or social or financial developments that reduce demand or the ability to meet demand.

The reality of such a situation is that not all services 512 that were operating before the failure will be operating at full capacity after the failure. Therefore, decisions must be made, in sequence, to repair some of the services, likely at the expense of other services. Determining what services are repaired, and to what degree, can in very limited cases be done manually by a customer, such as when at most a few dozen recovery operation sequencing decisions are required for full use of the available recovered capacity. But at the scale normally present in modern cloud computing environments (e.g., with a thousand or more virtual machines in a datacenter) the sheer amount of information that must be gathered and processed, the need to do that processing as quickly as possible, and the digital form of the information, each make human actions alone insufficient.

Moreover, human action alone may be too slow to prevent a cascade of failures that could have been prevented by suitable automation. For example, failure or other unavailability of a storage server could lead software agents that try unsuccessfully to contact the server to leak memory, which in turn reduces memory available to other software and degrades its performance. A similar cascade led to a significant service disruption in 2012 in Amazon Web Services (mark of Amazon Technologies, Inc.). In practical terms, recovery speed and the cost to execute a recovery are often important to the users of cloud computing environments, and to the vendors who provide services based on the cloud. Value can be measured by how quickly a service is restored to some minimal functioning state, and doing this recovery manually at scale would be prohibitively expensive in practice.

Some innovations described herein provide tools or techniques for dynamically assigning scarce computational resources without sacrificing the availability of any services, when that is possible after a large failure such as loss of a datacenter. Some innovations described herein provide tools or techniques for allocating scarce computational resources when not every service can be repaired to the level set forth in an SLA, SLO, or other subscription.

Some embodiments described herein may be viewed in a broader context. For instance, concepts such as availability, capacity, priority, and recovery may be relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems. Other media, systems, and methods involving availability, capacity, priority, or recovery are outside the present scope. Accordingly, vagueness, mere abstractness, lack of technical character, and accompanying proof problems are also avoided under a proper understanding of the present disclosure.

The technical character of embodiments described herein will be apparent to one of ordinary skill in the art, and will also be apparent in several ways to a wide range of attentive readers. First, some embodiments address technical activities that are rooted in cloud computing technology, such as allocating scarce computational resources and determining when computing services are either adequately available or fully available. Second, some embodiments include technical components such as computing hardware which interacts with software in a manner beyond the typical interactions within a general purpose computer. For example, in addition to normal interaction such as memory allocation in general, memory reads and write in general, instruction execution in general, and some sort of I/O, some embodiments described herein monitor particular computing service repair conditions such as the size of availability gaps, and the number of working instances. Third, technical effects provided by some embodiments include efficient repair of high priority services in a cloud without unnecessary termination of lower priority services in the cloud, prevention of premature service deployment after large failures, and dedication of restored capacity to a reserve against other failures. Fourth, some embodiments include technical adaptations such as availability specifications, repair priority specifications, and communications between tenants of a cloud and a shared fault recovery manager. Fifth, some embodiments modify technical functionality of a cloud computing environment by adding a fault recovery manager which controls service deployment and controls assignment of computing resources to services during repairs after an atypical failure. Sixth, technical advantages of some embodiments include improved efficiency in computing resource allocation, improved avoidance of application latency from service reductions, and improved communication between processes running in a cloud. Other advantages will also be apparent to one of skill from the description provided.

Acronyms and Abbreviations

Some acronyms and abbreviations are defined below. Others may be defined elsewhere herein or require no definition to be understood by one of skill.

ALU: arithmetic and logic unit
API: application program interface
APP: application
CD: compact disc
CPU: central processing unit
DC: datacenter
DVD: digital versatile disk or digital video disc FD: fault domain
FPGA: field-programmable gate array
FPU: floating point processing unit
FR: fault recovery
GPU: graphical processing unit
GUI: graphical user interface
IDE: integrated development environment, sometimes also called "interactive development environment"
MPI: message passing interface
MR: management role
OS: operating system
RAM: random access memory
REST: representational state transfer
ROM: read only memory
SDK: software development kit
SLA: service level agreement
SLO: service level objective
VM: virtual machine
XML: extensible markup language Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventor asserts and exercises his right to his own lexicography. Quoted terms are being defined explicitly, but a term may also be defined implicitly without using quotation marks. Terms may be defined, either explicitly or implicitly, here in the Detailed Description and/or elsewhere in the application file.

As used herein, a "computer system" may include, for example, one or more servers, motherboards, processing nodes, personal computers (portable or not), personal digital assistants, smartphones, smartwatches, smartbands, cell or mobile phones, other mobile devices having at least a processor and a memory, and/or other device(s) providing one or more processors controlled at least in part by instructions. The instructions may be in the form of firmware or other software in memory and/or specialized circuitry. In particular, although it may occur that many embodiments run on server computers, other embodiments may run on other computing devices, and any one or more such devices may be part of a given embodiment.

A "multithreaded" computer system is a computer system which supports multiple execution threads. The term "thread" should be understood to include any code capable of or subject to scheduling (and possibly to synchronization), and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit, such as a core in a simultaneous multithreading implementation. As another example, a hyperthreaded quad core chip running two threads per core has eight logical processors. A logical processor includes hardware. The term "logical" is used to prevent a mistaken conclusion that a given chip has at most one processor; "logical processor" and "processor" are used interchangeably herein. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Kernels" include operating systems, hypervisors, virtual machines, BIOS code, and similar hardware interface software.

"Code" means processor instructions, data (which includes constants, variables, and data structures), or both instructions and data. "Code" and "software" are used interchangeably herein. Executable code, interpreted code, and firmware are some examples of code.

"Capacity" means use or control of one or more computational resources.

"Optimize" means to improve, not necessarily to perfect. For example, it may be possible to make further improvements in a program or an algorithm which has been optimized.

"Program" is used broadly herein, to include applications, kernels, drivers, interrupt handlers, firmware, state machines, libraries, and other code written by programmers (who are also referred to as developers) and/or automatically generated.

"Routine" means a function, a procedure, an exception handler, an interrupt handler, or another block of instructions which receives control via a jump and a context save. A context save pushes a return address on a stack or otherwise saves the return address, and may also save register contents to be restored upon return from the routine.

"Service" means a program in a cloud computing environment.

"IoT" or "Internet of Things" means any networked collection of addressable embedded computing nodes. Such nodes are examples of computer systems as defined herein, but they also have at least two of the following characteristics: (a) no local human-readable display; (b) no local keyboard; (c) the primary source of input is sensors that track sources of non-linguistic data; (d) no local rotational disk storage—RAM chips or ROM chips provide the only local memory; (e) no CD or DVD drive; (f) embedment in a household appliance; (g) embedment in an implanted medical device; (h) embedment in a vehicle; (i) embedment in a process automation control system; or (j) a design focused on one of the following: environmental monitoring, civic infrastructure monitoring, industrial equipment monitoring, energy usage monitoring, human or animal health monitoring, or physical transportation system monitoring.

Unless otherwise indicated, "tenant" refers to an IaaS tenant; "tenant" may also refer to a PaaS tenant (i.e., tenant of a PaaS platform) when so indicated. The distinction between an IaaS tenant and a PaaS tenant may be notable in some situations. For example, from an IaaS tenant's perspective, operating systems running in virtual machines are not part of the infrastructure that is provided by the cloud provider, but from a PaaS tenant's perspective, those operating systems are part of the infrastructure provided by the PaaS provider. Similarly, unless otherwise expressly indicated by use of "PaaS", as used herein "infrastructure provider" or "cloud infrastructure provider" refers to an IaaS provider, and "infrastructure" or "cloud infrastructure" refers to infrastructure which includes at least one virtual machine but does not necessarily include an operating system. These default interpretations in favor of IaaS are provided for clarity, but one of skill will acknowledge after study that the teachings herein pertain in most ways to both kinds of infrastructure providers.

It should also be understood that "infrastructure provider" and "tenant" are used herein in distinction to one another; they are different roles within the cloud computing environment. An infrastructure provider provides cloud infrastructure (e.g., virtual machines, operating systems) which is used by the tenant. The infrastructure provider and the tenant are independently controlled entities unless expressly stated otherwise. A PaaS provider (PSP) plays both roles: the PSP is an infrastructure provider with respect to a tenant who develops or runs application software on the platform provided by the PSP, and the PSP is a tenant with respect to an IaaS provider who provides the virtual machines the PaaS platform runs on.

The computing services discussed herein may belong to a tenant or an infrastructure provider. It is expected that the fault recovery manager taught herein will usually be implemented as part of an infrastructure, and that is understood to be the case unless otherwise clearly indicated. However, a tenant-controlled fault recovery manager is also within the scope of the present teachings.

As used herein, "independently controlled" entities in a cloud may include tenants and/or infrastructure providers which are recognized in the legal jurisdiction of each as being separate from one another with respect to at least one of the following: obligations to tax authorities, property ownership, product liability, contractual rights and obligations, rights under criminal law.

A "hypervisor" is a software platform that runs virtual machines. Some examples include Xen® (mark of Citrix Systems, Inc.), Hyper-V® (mark of Microsoft Corporation), and KVM (Kernel-based Virtual Machine) software.

The terms "fault" and "failure" are used interchangeably herein.

The terms "repair" and "recovery" are used interchangeably herein.

With regard to computational resources, the terms "assign", "reassign", "allocate", and "reallocate" are used interchangeably herein.

As used herein, "include" allows additional elements (i.e., includes means comprises) unless otherwise stated. "Consists of" means consists essentially of, or consists entirely of. X consists essentially of Y when the non-Y part of X, if any, can be freely altered, removed, and/or added without altering the functionality of claimed embodiments so far as a claim in question is concerned.

"Process" is sometimes used herein as a term of the computing science arts, and in that technical sense encompasses resource users, namely, coroutines, threads, tasks, interrupt handlers, application processes, kernel processes, procedures, and object methods, for example. "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment. Operations such as transmitting capacity assignment commands, identifying capacity availability gaps, and approving and performing capacity reassignments, are understood herein as requiring and providing speed and accuracy that are not obtainable by human mental steps, in addition to their inherently digital nature. This is understood by persons of skill in the art but others may sometimes need to be informed or reminded of that fact.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

"Linguistically" means by using a natural language or another form of communication which is often employed in face-to-face human-to-human communication. Communicating linguistically includes, for example, speaking, typing, or gesturing with one's fingers, hands, face, and/or body.

Throughout this document, use of the optional plural "(s)", "(es)", or "(ies)" means that one or more of the indicated feature is present. For example, "processor(s)" means "one or more processors" or equivalently "at least one processor".

For the purposes of United States law and practice, use of the word "step" herein, in the claims or elsewhere, is not intended to invoke means-plus-function, step-plus-function, or 35 United State Code Section 112 Sixth Paragraph/Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, would be deemed part of the structures identified in the application for zac widgets and would help define the set of equivalents for zac widget structures.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as allocating, allowing, assigning, calculating, choosing, dedicating, deploying, determining, favoring, increasing, killing, occurring, preventing, reassigning, receiving, reducing, repeating, selecting, sending, starting, sorting, terminating (and allocates, allocated, allows, allowed, etc.) with regard to a destination or other subject may involve intervening action such as forwarding, copying, uploading, downloading, encoding, decoding, compressing, decompressing, encrypting, decrypting, authenticating, invoking, and so on by some other party, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other computer-readable storage medium is not a propagating signal or a carrier wave outside the scope of patentable subject matter under United States Patent and Trademark Office (USPTO) interpretation of the In re Nuijten case. No claim covers a signal per se in the United States, and any claim interpretation that asserts otherwise is unreasonable on its face. Unless expressly stated otherwise in a claim granted outside the United States, a claim does not cover a signal per se.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise in the claim, "computer readable medium" means a computer readable storage medium, not a propagating signal per se.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

100 cloud computing operating environment, also referred to as a cloud or as an operating environment
102 computer system
104 users
106 peripherals
108 network 110 processor
112 computer-readable storage medium, e.g., RAM, hard disks
114 removable configured computer-readable storage medium
116 instructions executable with processor
118 data
120 tenant, e.g., guest
122 software controlled and/or provided primarily by a tenant
124 infrastructure provider, e.g., cloud infrastructure services provider
126 software controlled and/or provided primarily by infrastructure provider
128 system hardware in addition to processor and memory
130 capacity generally
200 illustrative portion A of a cloud computing environment architecture
202 tenant applications
204 software libraries
206 software development tools, e.g., compiler, debugger, profiler, etc.
208 interfaces, e.g., management consoles, command line interfaces
210 software development kits
212 value-added services
214 authentication and/or authorization service
216 monitoring and/or alerting service
218 deployment engine and/or deployment service
220 capacity provisioning service, e.g., shard allocation, VM scaling
222 load balancing service
224 platform blocks which support one or more applications
226 parallel processing block
228 payment processing block
230 content delivery block
232 workforce block
234 email block
236 messaging block
238 infrastructure blocks (some examples of infrastructure pieces)
240 compute block
242 storage block
244 networking block
246 database block
248 physical infrastructure of cloud computing environment, and groupings thereof
250 geographic regions
252 availability zones
254 cloud edge locations
256 datacenters
300 illustrative portion B of a cloud computing environment architecture
302 operating system
304 storage blob (binary large object)
306 virtual machine
308 resource manager
310 platform
312 fabric
314 management software and data for managing physical infrastructure
316 anti-virus software
400 illustrative portion C of a cloud computing environment architecture
402 business app program
404 web service
406 multimedia app or service
408 software-as-a-service (SaaS)
410 software framework
412 platform-as-a-service (PaaS)
414 network bandwidth
416 infrastructure-as-a-service (IaaS)
502 fault recovery manager system (includes computing hardware configured with special-purpose software 510 and/or special-purpose fault recovery management circuitry)
504 specification used in resolving competition for scarce resources
506 repair priority assigned to particular service or kind of service
508 availability information for particular service or kind of service
510 fault recovery manager software
512 service which uses computing resources
514 fault recovery command from fault recovery manager to service
516 response to fault recovery command
518 information as to current functional capacity; may also refer to the current functional capacity itself (capacity generally is denoted 130)
602 number of availability zones used in normal operation
604 minimum capacity needed to be operational
606 subscribed capacity
608 service identifier
610 specification credentials, access history, checksum, or similar security data
612 other specification data not covered by items 602-610, if any
702 working instance of a service
704 computational resources generally
800 flowchart illustrating aspects of some methods
802 select a higher priority service
804 choose a lower priority service
806 reduce lower priority service's capacity
808 reduce the number of working instances
810 current number of working instances
812 increase a higher priority service's capacity
814 increase the number of working instances
816 repeat steps reassigning capacity to higher priority service
818 a condition terminating a repetition of capacity reassignment steps (may be followed immediately or later by additional capacity reassignment steps)
820 occurrence of a condition 818
822 prevent deployment of one or more additional services
824 allow deployment of one or more additional services
826 deployment of one or more additional services
828 calculate availability gap
830 availability gap
832 favor closing of larger availability gap when reassigning capacity
834 sort services by availability gap size
836 assign or reassign capacity by assigning or reassigning resources
838 dedicate resources to a reserve
840 reserve against failures; may also serve as a buffer against demand increases in some implementations
842 kill a working instance
844 start a working instance
846 fully terminate a service, e.g., kill all of its working instances
848 determine that a capacity deficit exists 850 capacity deficit (subscribed capacity exceeds functional capacity)
852 calculate assigned capacity
854 send a command to change one or more capacity assignments
856 receive a response to a capacity assignment command
902 regional fault recovery manager system
904 infrastructure update deployment engine (an example of a deployment engine)
906 guest update deployment engine (another example of a deployment engine)
1002 server (an example of a computer system)
1004 server rack (an example of system hardware)
1006 component for determining fault domain
1008 fault domain
1102 a condition in which a higher priority service's assigned capacity is at or above a minimum operating level for the higher priority service
1104 a condition in which a higher priority service's assigned capacity is at or above a subscribed level for the higher priority service
1106 a condition in which a lower priority service's assigned capacity is at a minimum operating level for the lower priority service
1108 reallocate capacity, e.g., by reducing lower priority service capacity and increasing higher priority service capacity Operating Environments With reference to FIG. 1, an operating environment 100 for an embodiment, also referred to as a cloud 100, includes at least one computer system 102. The computer system 102 may be a multiprocessor computer system, or not. An operating environment may include one or more machines in a given computer system, which may be clustered, client-server networked, and/or peer-to-peer networked within a cloud 100. An individual machine is a computer system, and a group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A user interface may support interaction between an embodiment and one or more human users. A user interface may include a command line interface, a graphical user interface (GUI), natural user interface (NUI), voice command interface, and/or other user interface (UI) presentations. A user interface 122 may be generated on a local desktop computer, or on a smart phone, for example, or it may be generated from a web server and sent to a client. The user interface may be generated as part of a service and it may be integrated with other services, such as social networking services. A given operating environment includes devices and infrastructure which support these different user interface generation options and uses.

Natural user interface (NUI) operation may use speech recognition, touch and stylus recognition, gesture recognition both on screen and adjacent to the screen, air gestures, head and eye tracking, voice and speech, vision, touch, gestures, and/or machine intelligence, for example. Some examples of NUI technologies include touch sensitive displays, voice and speech recognition, intention and goal understanding, motion gesture detection using depth cameras (such as stereoscopic camera systems, infrared camera systems, RGB camera systems and combinations of these), motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (electroencephalograph and related tools).

System administrators, developers, engineers, and end-users are each a particular type of user 104. Automated agents, scripts, playback software, and the like acting on behalf of one or more people may also be users 104. Storage devices and/or networking devices may be considered peripheral equipment in some embodiments and part of a system 102 in other embodiments. Other computer systems not shown in FIG. 1 may interact in technological ways with the computer system 102 or with another system embodiment using one or more connections to a network 108 via network interface equipment, for example.

Each computer system 102 includes at least one logical processor 110. The computer system 102, like other suitable systems, also includes one or more computer-readable storage media 112. Media 112 may be of different physical types. The media 112 may be volatile memory, non-volatile memory, fixed in place media, removable media, magnetic media, optical media, solid-state media, and/or of other types of physical durable storage media (as opposed to merely a propagated signal). In particular, a configured medium 114 such as a portable (i.e., external) hard drive, CD, DVD, memory stick, or other removable non-volatile memory medium may become functionally a technological part of the computer system when inserted or otherwise installed, making its content accessible for interaction with and use by processor 110. The removable configured medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se under any claim pending or granted in the United States.

The medium 114 is configured with binary instructions 116 that are executable by a processor 110; "executable" is used in a broad sense herein to include machine code, interpretable code, bytecode, and/or code that runs on a virtual machine, for example. The medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

Although an embodiment may be described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In the illustrated cloud environment 100, a tenant 120 runs tenant software 122. The tenant software 122 will often include application software, but other examples are also discussed in connection with FIGS. 2 to 4. A given tenant may run multiple instances of a given software 122, and/or may run a plurality of different software programs 122, as shown. The tenant software 122 may include a computing service or operate as a computing service, and may be among services that compete for scarce computational resources after a failure. Although for clarity of illustration only one tenant is shown in FIG. 1, a given cloud 100 typically will have multiple tenants 120.

The illustrated cloud environment 100 also has at least one infrastructure provider 124 who provides infrastructure software 126. The infrastructure software 126 may include a computing service or operate as a computing service, and may be among services that compete for scarce computational resources after a failure. Some examples of infrastructure are discussed in connection with FIGS. 2 to 4, but one of skill will recognize that infrastructure providers are often categorized by whether they provide IaaS or PaaS infrastructure as a service. For present purposes, a line is drawn between virtual machines 306 and operating systems 302: IaaS providers are those who provide virtual machines and/or provide software and/or hardware underlying virtual machines, while PaaS providers are those who provide operating systems and/or provide software that runs on top of an operating system (which runs in turn on a virtual machine provided by an IaaS provider).

In addition to processors 110 (CPUs, ALUs, FPUs, and/or GPUs), memory/storage media 112, an operating environment may also include other hardware 128, such as displays, batteries, buses, power supplies, wired and wireless network interface cards, accelerators, racks, and network cables, for instance. A display may include one or more touch screens, screens responsive to input from a pen or tablet, or screens which operate solely for output. Cloud hardware such as processors, memory, and networking hardware are provided at least in part by an IaaS provider.

In some embodiments peripherals 106 such as human user I/O devices (screen, keyboard, mouse, tablet, microphone, speaker, motion sensor, etc.) will be present in operable communication with one or more processors 110 and memory. However, an embodiment may also be deeply embedded in a technical system, such as a portion of the Internet of Things, such that no human user 104 interacts directly with the embodiment. Software processes may be users 104.

In some embodiments, the system includes multiple computers connected by a network 108. Networking interface equipment can provide access to networks 108, using components such as a packet-switched network interface card, a wireless transceiver, or a telephone network interface, for example, which may be present in a given computer system. However, an embodiment may also communicate technical data and/or technical instructions through direct memory access, removable nonvolatile media, or other information storage-retrieval and/or transmission approaches.

The tenant code 122, infrastructure code 126, and other items shown in the Figures and/or discussed in the text, may each reside partially or entirely within one or more hardware media 112, thereby configuring those media for technical effects which go beyond the "normal" (i.e., least common denominator) interactions inherent in all hardware—software cooperative operation.

One of skill will appreciate that the foregoing aspects and other aspects presented herein under "Operating Environments" may form part of a given embodiment. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but may interoperate with items in the operating environment or some embodiments as discussed herein. It does not follow that items not in outline or parenthetical form are necessarily required, in any Figure or any embodiment. In particular, FIG. 1 is provided for convenience; inclusion of an item in FIG. 1 does not imply that the item, or the described use of the item, was known prior to the current innovations.

Cloud Architecture Examples

Figure 2:
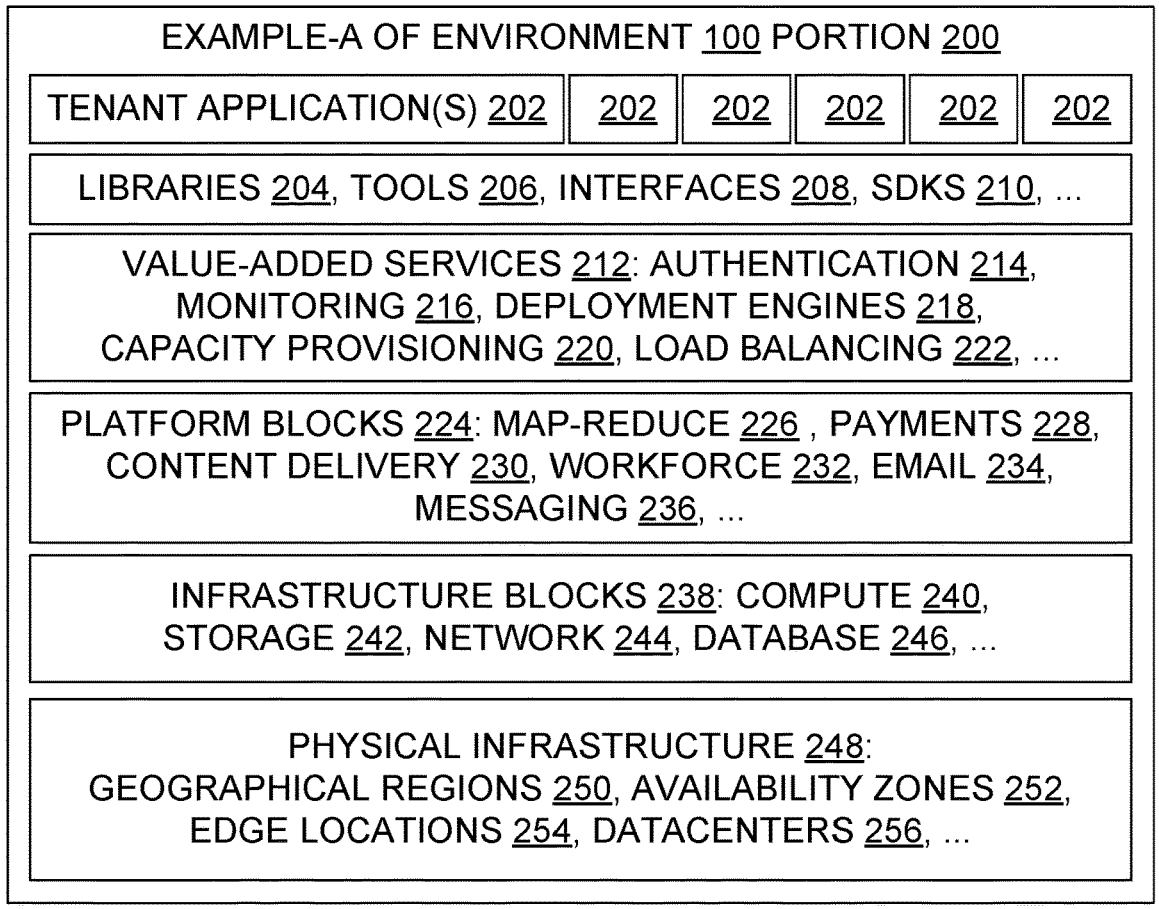
FIG. 2 is a block diagram illustrating aspects of an example cloud computing architecture that is designated here as Example-A.
Figure 3:
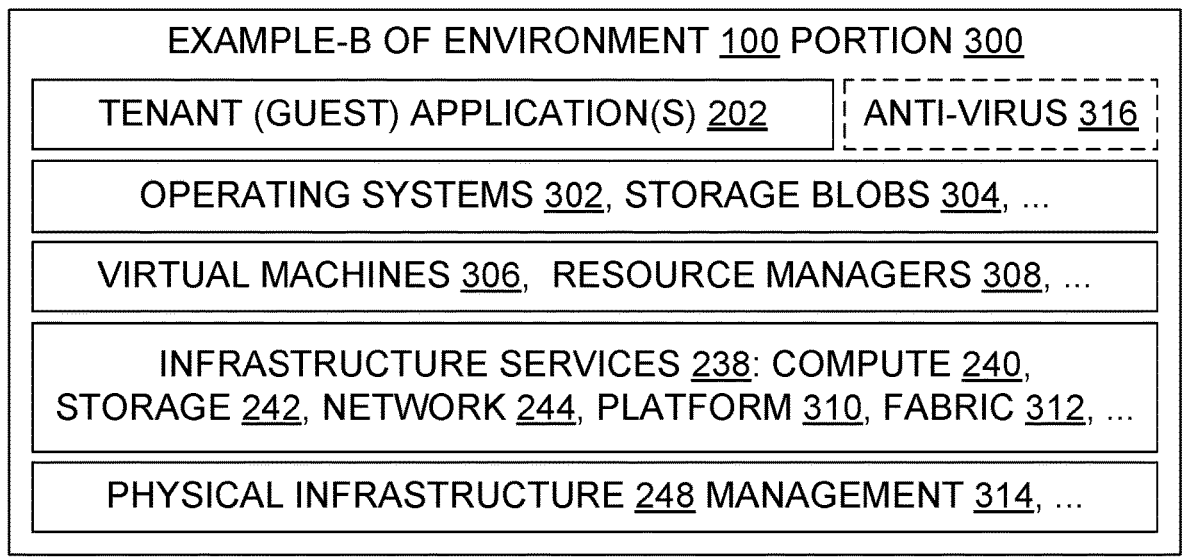
FIG. 3 is a block diagram illustrating aspects of an example cloud computing architecture that is designated here as Example-B.
Figure 4:
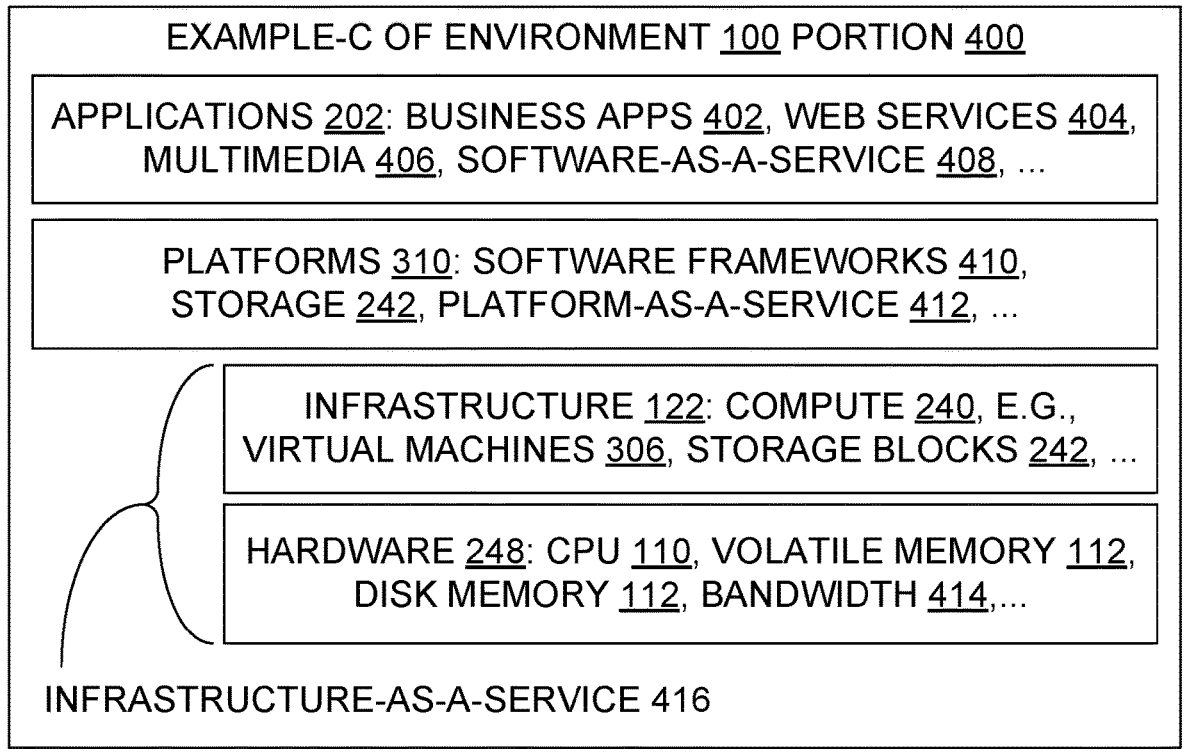
FIG. 4 is a block diagram illustrating aspects of an example cloud computing architecture that is designated here as Example-C.

Although the fault recovery manager and other innovations described herein are believed to be new, the architectural contexts which they can modify and be used within have aspects which are familiar to those of skill in the art. To help illustrate aspects of the innovations presented herein, FIGS. 2 through 4 present examples of different cloud architectures. The variation in these architectures helps illustrate the wide range of cloud operating environments in which fault recovery innovations can be used, and these architectural Figures provide specific examples of cloud tenants, PaaS infrastructures, and IaaS infrastructures, which can now be reconsidered by those of skill and improved in light of the innovative teachings herein.

FIG. 2 illustrates aspects of an architecture which is suitable for use with some embodiments. This architecture portion 200 is generally consistent with public documentation depicting an architecture in some implementations of an Amazon Web Services™ cloud 100 (mark of Amazon Technologies, Inc.) but may also differ from a given implementation of that technology.

In this architecture Example-A, from an IaaS tenant perspective the IaaS infrastructure includes physical infrastructure 248 and infrastructure blocks 238. From an IaaS 416 provider perspective, tenant software 122 includes platform blocks 224, value-added services 212, libraries 204, tools 206, interfaces 208, software development kits 210, and applications 202. A PaaS 412 provider may draw a different line between tenant software and infrastructure, e.g., by treating everything below the tenant applications 202 as part of the infrastructure that is provided by the PaaS provider for use by tenants. Other divisions of items between entities are also possible. Which perspective applies to a tenant in a given situation depends on the services the tenant has engaged. One tenant of this cloud architecture 200 might engage only the physical infrastructure 248 and infrastructure blocks 238, while another tenant engages the physical infrastructure 248, infrastructure blocks 238, and platform blocks 224, but does not use the value-added services 212, for example.

In an architecture such as the one in Example-A, and in some others, libraries 204 and SDKs 210 may include, for example, Microsoft .NET™ libraries and SDKs (mark of Microsoft Corporation), and Java® libraries and SDKs (mark of Oracle America, Inc.). Tools 206 may include cloud resource administration tools, software development tools such as compilers, profilers, and debuggers, deployment tools, sample code, and other items. Interfaces 208 may include web interfaces, e.g., REST APIs, and/or command line interfaces, for example.

In the illustrated architecture, value-added services 212 include one or more of the following: authentication and/or authorization services 214 for identity verification and access management; monitoring services 216 for collecting and tracking computational resource usage metrics, error rates, transaction volumes, and other performance statistics; deployment engines 218 for deploying instances of software in multiple virtual machines; capacity provisioning services 220 for scaling up or down on demand the computing, storage and/or other resources used by tenant software; and load balancing services 222 for balancing computational workloads across multiple servers or other physical resources (sometimes indirectly via balancing across virtual machines, virtual disks, or other virtualized resources).

In the illustrated architecture, platform blocks 224 include one or more of the following: map-reduce and/or other parallel processing blocks 226; payment-processing blocks 228; content delivery blocks 230; workforce blocks 232 for human users in an on-demand workforce to obtain instructions and assignments; email blocks 234; and messaging blocks 236.

In the illustrated architecture, infrastructure blocks 238 include one or more of the following: compute blocks 240 which provide computational capacity; storage blocks 242 which provide storage capacity; network blocks 244 which provide networking capacity; and database blocks 246 which provide database computational and/or storage capacity.

In the illustrated architecture, physical infrastructure 248 includes one or more of the following: geographical regions 250; availability zones 252; edge locations 254 at the edge of the cloud as access points, portals, or interfaces; and datacenters 256 which house the servers and other devices containing the processors 110 and memory 112 to be used by the rest of the cloud architecture.

FIG. 3 illustrates aspects of an architecture which is suitable for use with some embodiments. This architecture portion 300 is generally consistent with public documentation depicting an architecture in some implementations of a Microsoft Azure® Stack cloud environment 100 (mark of Microsoft Corporation) but may also differ from a given implementation of that technology.

In the illustrated architecture, operating systems 302 include software which performs operations such as recognizing input from network connections or peripherals, sending output to network connections or peripherals, keeping track of files and directories in non-volatile storage, and allocating processor and memory resources to applications. Familiar examples of operating systems include software available under names such as Apple OS X, Microsoft Windows, Linux, VMS, and IBM OS/400 (marks of their respective owners), but operating system development is an ongoing activity, and the operating systems 302 are not limited to these particular examples or their variants. Dozens if not hundreds of different operating systems 302 exist.

In the illustrated architecture, a storage blob 304 includes binary data stored as a single item; "blob" stands for binary large object. The data in a given blob may represent anything: video, audio, and executable code are familiar examples of blob content, but other content may also be stored in blobs 304.

In the illustrated architecture, a virtual machine 306 is an emulation of a real or hypothetical physical computer system. Each virtual machine is backed by actual physical computing hardware (e.g., processor 110, memory 112) and can support execution of at least one operating system.

In the illustrated architecture, resource managers 308 control computing resources, such as virtual machines 306, networks 108, and their constituents. Resource control may be implemented through access limitations, provisioning, deployment, and monitoring operations, for example.

In the illustrated architecture, a platform 310 is a software development platform, such as an operating system 302 and an SDK. Platforms 310 are provided in some environments as a service from a PaaS 412 provider.

In the illustrated architecture, a fabric 312 provides a runtime for building distributed, scalable stateless and stateful microservices. Some fabrics 312 also provide application management capabilities for provisioning, deploying, monitoring, upgrading/patching, and deleting deployed microservices and/or applications that use microservices. Some examples of microservices include protocol gateways, user profiles, shopping carts, inventory processing, queues, and caches. In some environments, a fabric and microservices may be part of the infrastructure software that is provided by a PaaS provider.

In the illustrated architecture, physical infrastructure management software 314 includes region pairing specifications and protocol implementation code, code which balances or otherwise distributes virtual machines across fault domains within a datacenter and/or across availability zones, synchronous and asynchronous replication code, hardware fault detection code, transparent virtual machine migration code, and other administrative code.

FIG. 4 illustrates aspects of an architecture which is suitable for use with some embodiments. This architecture portion 400 is generally consistent with public documentation depicting a generic cloud architecture but may differ from a given implementation of a cloud computing environment 100. One of skill will also acknowledge that architectural pieces from any of these examples 200, 300, 400 may be mixed and combined in ways that are not shown here, e.g., an architecture 200 will generally include operating systems 302 and bandwidth 414.

In the illustrated architecture 400, business apps 402 may include online transaction processing applications, ecommerce applications, customer relationship management software, and other enterprise software, for example. In some embodiments, business apps 402 include software-as-a-service (SaaS) 408 offerings. SaaS offerings, sometimes referred to as "on-demand software", provide access to software on a subscription basis over a network from one or more hosting locations.

In the illustrated architecture, web services 404 may include social networks, and other human-user-facing web-based applications and their underlying APIs, for example.

In the illustrated architecture, multimedia 406 may include user-supplied content video websites, e.g., the YouTube® website (mark of Google Inc.) and similar websites. Multimedia 406 may also include media enterprise video rental, streaming, and/or subscription websites, such as the Netflix® website (mark of Netflix, Inc.) or the Hulu® website (mark of Hulu LLC), for example.

In the illustrated architecture, software frameworks 410 may include general-purpose runtime environments which can be tailored to specific uses by the addition of user-written application code. Users can extend the framework but usually cannot modify it. Some familiar examples include the JavaScript® web application framework (mark of Oracle America, Inc.) and the Microsoft .NET™ framework.

In the illustrated architecture, bandwidth 414 refers to hardware which provides network transmission capacity. Bandwidth generally refers to the capacity of an electronic system to send and/or receive data. Like processors 110, memory 112, and similar items, bandwidth 414 will be present in a given cloud 100 regardless of whether that cloud precisely matches a particular example depicted or discussed herein.

As to IaaS 416, one of skill will recognize that different offerings may contain different constituents. For present purposes, IaaS includes at least virtual machines 306 and their supporting physical systems 102. Some examples of available IaaS offerings may include Amazon Web Services (AWS), Microsoft Windows Azure, Google Compute Engine, CenturyLink Cloud, VMWare vCloud Air, Rackspace, and IBM SoftLayer (marks of their respective owners).

Any of the items presented in FIGS. 2-4 which are described expressly or implicitly as microservices, interfaces, or services may include or operate as one or more services which compete for computational resources after a failure and thus may have their capacity 130 managed as taught herein. Computing services may also include other items in a particular example.

Any of the items presented in FIGS. 2-4 which are described expressly or implicitly as resources, blocks, infrastructure, or platforms may include or operate as computational resources or capacity which is managed after a failure as taught herein. Capacity may also include other items in a particular example.

A given item may operate both as a service and as a resource in some implementations. For instance, a given library 204 instance may provide computing services to an application 202, and at the same time processors, memory, and network bandwidth access may be associated with and controlled by the library in question, effectively making the library a computational resource and a part of the application's assigned capacity 130.

Some examples provide or use a system for fault recovery management in a cloud computing environment 100 having computational resources 704 which support computing services 512. The system includes at least one processor 110, a memory 112 in operable communication with the processor, and fault recovery management software 510 residing in the memory and executable with the processor to perform a method which reassigns capacity 130 from lower priority computing services 512 to higher priority computing services 512 without reducing any computing service below a minimal availability 604, unless a situation occurs in which at least one computing service still has less than minimal availability and no computing service has more than minimal availability. In that situation, the fault recovery management software fully terminates 846 a lower priority computing service whose priority is lower than the priority of a higher priority computing service, thereby allowing reassignment 836 to the higher priority computing service of at least a portion of computational resources that were freed by the termination.

In some examples, the fault recovery management software 510 determines a priority of a given computing service at least in part by reading a specification 504. The specification 504 specifies at least one of the following: (a) a number 602 of availability zones used during normal operation of the computing service; (b) a minimum acceptable set 604 of assigned computational resources for the computing service to be considered operational during a loss of an availability zone; (c) an indication of whether the computing service shall be returned to a subscribed capacity 606, and if return to the subscribed capacity is optional then an indication of the minimal capacity for the computing service to be functional; or (d) a repair priority 506 of the computing service relative to other computing services.

In some examples, the cloud computing environment 100 includes a data center 256, and the fault recovery management software 510 operates to prevent 822 deployment to the data center of any additional computing service until each computing service executing in the data center has at least minimal availability 604.

In some examples, the cloud computing environment 100 includes an availability zone 252 having a total subscribed capacity 606 which exceeds a current total functioning capacity 518 of the availability zone, and the fault recovery management software 510 operates to reassign capacity in at least one of the following ways: (a) by killing one low priority instance 702, then starting one high priority instance, and then repeating killing and starting in that order with other instances; (b) by killing M low priority instances 702, then starting M high priority instances, and then repeating killing and starting in that order with other instances, with M being greater than one; or (c) by killing M low priority instances 702, then starting N high priority instances, with N and M being different positive integers.

In some examples, the cloud computing environment 100 includes an availability zone having a total functioning capacity which is no more than seventy percent of a total subscribed capacity of the availability zone. In some cases, the availability zone has a total functioning capacity which is no more than sixty percent of total subscribed capacity of the availability zone. In some cases, the availability zone has a total functioning capacity which is no more than fifty percent of total subscribed capacity of the availability zone. In some cases, the availability zone has a total functioning capacity which is no more than forty percent of total subscribed capacity of the availability zone.

Fault Recovery Manager Examples

Figure 5:
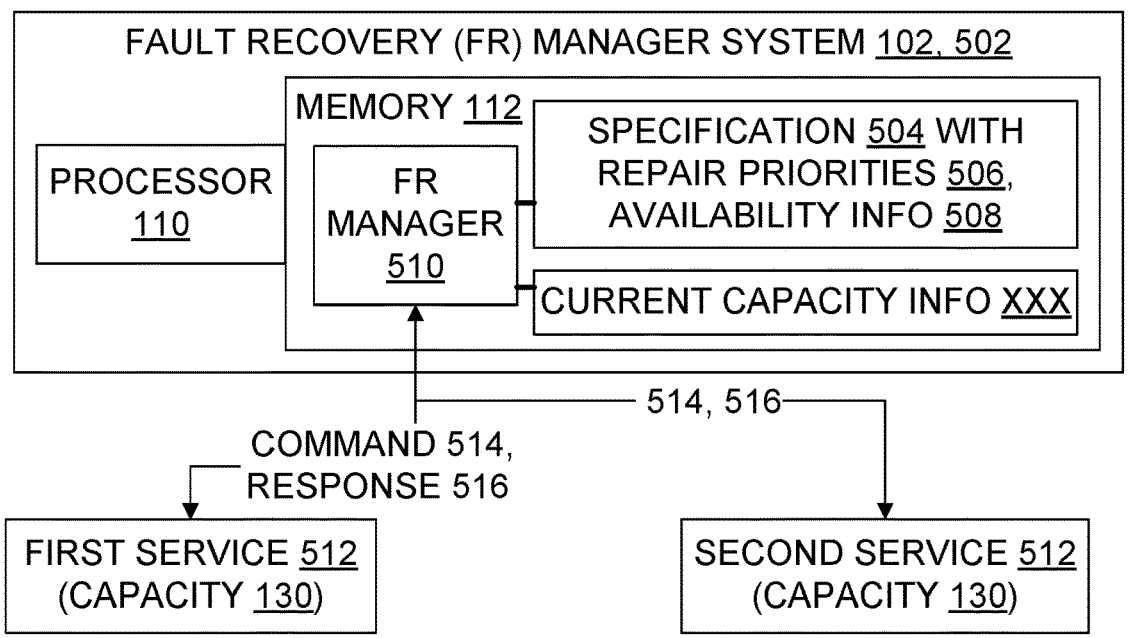
FIG. 5 is a data flow diagram illustrating aspects of an architecture which manages fault recovery in a cloud.

FIG. 5 illustrates data flow in some embodiments. Traditionally, to the inventor's knowledge no detailed automatic procedure for allocation of scarce resources after a large failure (e.g., one that exceeds reserve hardware capacity) has been implemented by cloud software tailored to that procedure, and the independently controlled tenants of a given cloud have not communicated with one another or with a central fault recovery manager on the basis of their mutual presence in the same cloud 100 with regard to the possibility that their recovery efforts might compete for the same computing resources or otherwise conflict at a computational resource level within the cloud they share after a large fault. As illustrated in FIG. 5, in some examples using innovations taught herein, different tenants 120 automatically coordinate their recovery plans and activities through a shared fault recovery manager system 502. The coordination may use one or more specifications 504, which may also be referred to as policies, containing relative repair priorities 506 and availability information 508 for different kinds of recovery activity and/or different entities.

In the FIG. 5 example, fault recovery manager software 510 communicates with the two services 512. The services 512 may belong to the same tenant 120 or to different tenants 120. During fault recovery, the fault recovery manager 510 sends each service 512 fault recovery commands 514 and receives back from the services 512 one or more fault recovery responses 516. The commands 514 and responses 516 may be communicated through any suitable electronic communication mechanisms, formats, and protocols, including by way of example web APIs, XML structures, binary data exchanges, and/or MPI code, to name just a few.

The contents used in particular implementations of commands 514 and responses 516 may vary, and may include data used in examples herein. For instance, a command 514 may include a command identification, a fault recovery manager identification and corresponding authentication, and a command detail that may impact the capacity 130 of the service, e.g., an amount of one or more particular computational resources such as memory or VMs the service is to relinquish control over so it can be reassigned, a number of working instances 702 the service is to kill, or a command to the service to fully terminate itself and thereby free all of its capacity. A response 516 may include an identification or copy of the command 514 the response is responsive to, and either an objection to the command or else an indication that the command has been performed and perhaps also include an update on the capacity now held by the service as a result of performing the command. Some responses 516 may include a counterproposal for a different time of performance or a different action if the command in question was not fully performed or not performed even in part.

Figure 6:
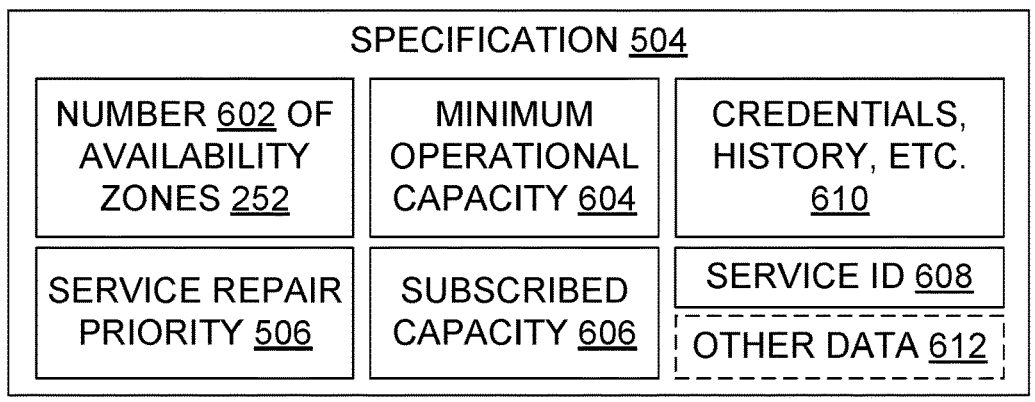
FIG. 6 is a block diagram illustrating an example of a fault recovery management specification.

As illustrated in FIG. 6, in some examples using innovations taught herein, one or more specifications 504 may also be used by the fault recovery manager system 502 to resolve competing needs, requests, or demands for scarce computational resources. A specification 504 may include data for one or more services 512 or groups of services, such as the minimum number 602 of availability zones 252 the service should run on, the minimum capacity 604 the service should be provided (capacity may be in virtual machine count, processor cycles per second, gigabytes of storage, network bandwidth, and other appropriate measures), the service's subscribed capacity 606 under an SLA or otherwise, the service's repair priority 506 relative to other services, the service's identifier 608, the specification's credentials and revision history 610, and other data 612 such as an SLA identifier or an administrator's contact info.

Figure 7:
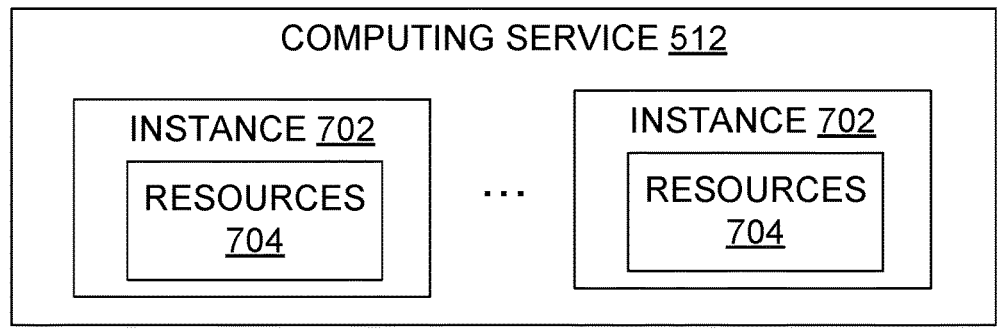
FIG. 7 is a block diagram illustrating an example of a computing service and its constituent working instances.

As illustrated in FIG. 7, in some examples a computing service 512 has multiple working instances 702, each of which has capacity 130 in that each working instance controls computational resources 704 allocated to that working instance. In examples where resource allocation is managed by infrastructure software 126, the fault recovery manager 510 may communicate (e.g., send commands 514, receive responses 516) with that infrastructure software 126 rather than communicating directly with services 512 as shown in FIG. 5. Indeed, in some implementations the fault recovery manager 510 may be part of the infrastructure software 126 that manages resource 704 allocation and thus may be viewed as communicating, if at all, primarily or solely with itself when terminating or starting instances 702 and otherwise managing capacity 130 allocations.

Processes

Examples are provided herein to help illustrate aspects of the technology, but the examples given within this document do not describe all of the possible embodiments. Embodiments are not limited to the specific implementations, arrangements, displays, features, approaches, or scenarios provided herein. A given embodiment may include additional or different technical features, mechanisms, sequences, or data structures, for instance, and may otherwise depart from the examples provided herein.

Figure 8:
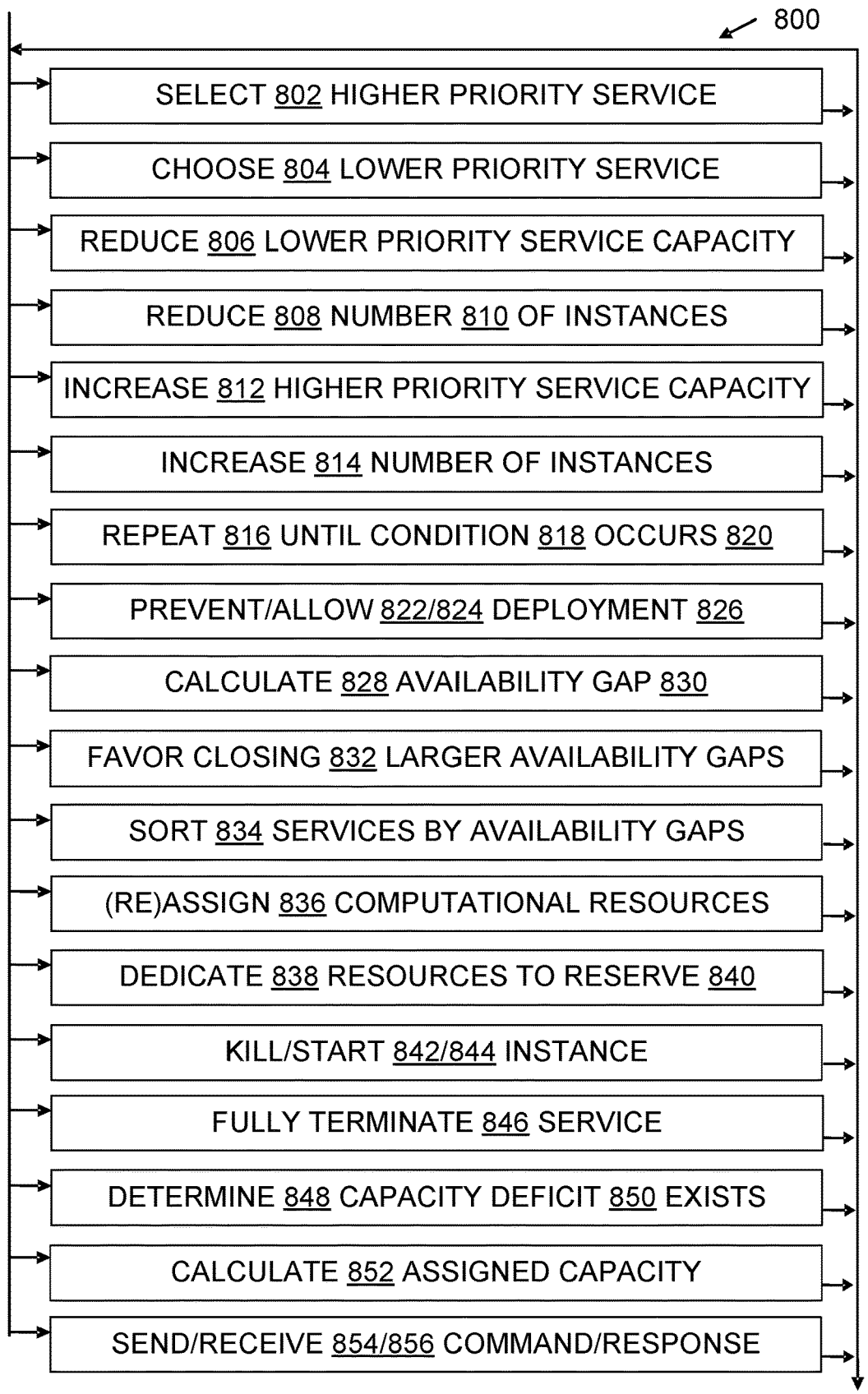
FIG. 8 is a flow chart illustrating aspects of some process and configured storage medium embodiments.

FIG. 8 illustrates some process embodiments in a flowchart 800. Technical processes shown in the Figures or otherwise disclosed will be performed automatically, e.g., by fault recovery manager 510 code and service 512 code, unless otherwise indicated. Processes may also be performed in part automatically and in part manually to the extent action by a human administrator or other human person is implicated. No process contemplated as innovative herein is entirely manual. In a given embodiment zero or more illustrated steps of a process may be repeated, perhaps with different parameters or data to operate on. Steps in an embodiment may also be done in a different order than the top-to-bottom order that is laid out in FIG. 8. Steps may be performed serially, in a partially overlapping manner, or fully in parallel. The order in which flowchart 800 is traversed to indicate the steps performed during a process may vary from one performance of the process to another performance of the process. The flowchart traversal order may also vary from one process embodiment to another process embodiment. Steps may also be omitted, combined, renamed, regrouped, or otherwise depart from the illustrated flow, provided that the process performed is operable and conforms to at least one claim.

Figure 11:
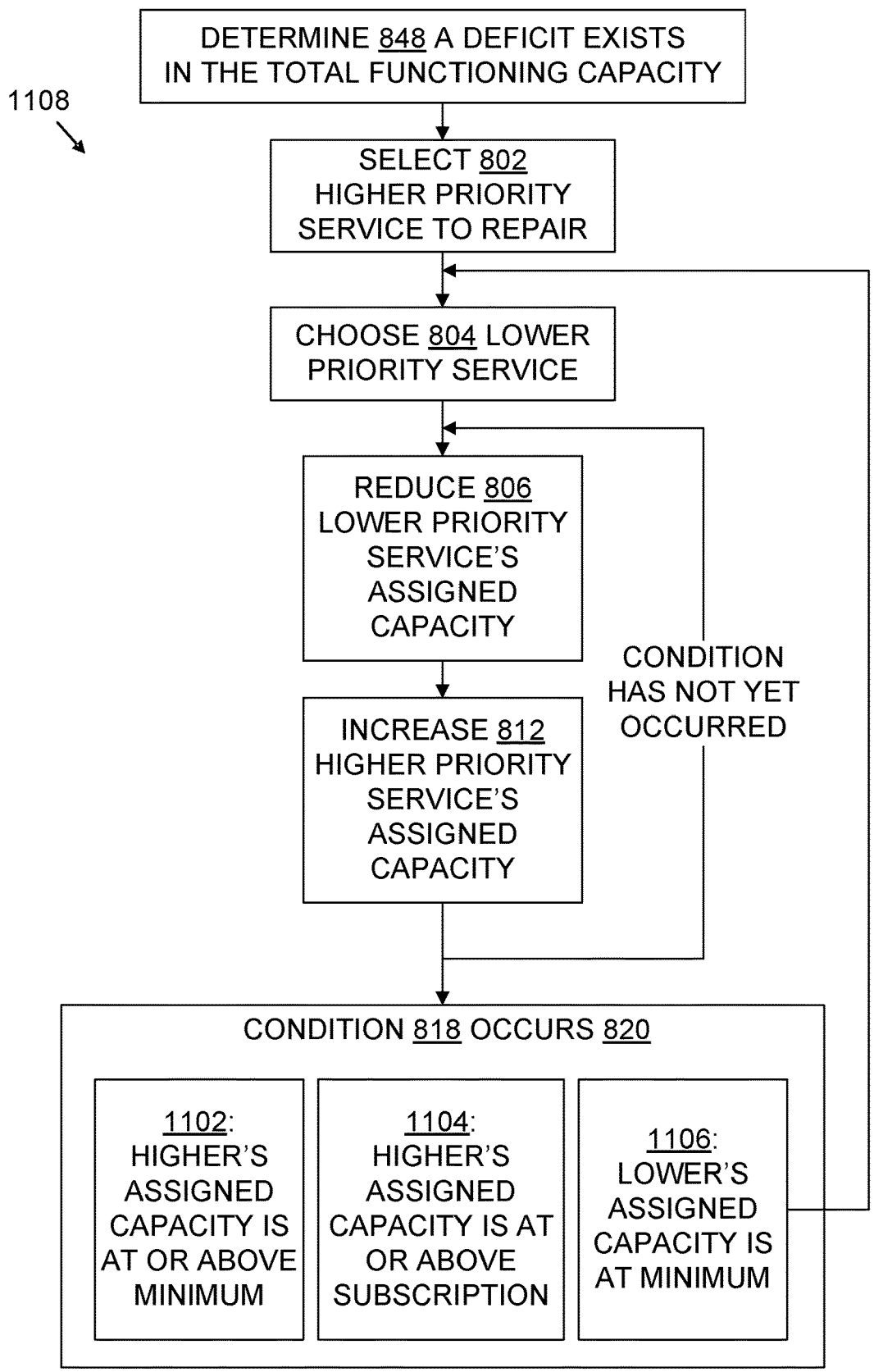
FIG. 11 is flow chart further illustrating aspects of some process and configured storage medium embodiments for fault recovery management based on computing service repair priorities.

FIG. 11 also illustrates processes provided or used in some embodiments. As with FIG. 8, one of skill will understand that the flowchart shown can be traversed in various ways during different performances of the illustrated processes. For instance, one process instance may include no repetition of steps 806 and 812 whereas another process instance includes one (or more) repetitions of those steps. Likewise, one process instance may conclude at a condition 1102 in which a higher priority service's assigned capacity moves upward enough to reach the minimum capacity 604 specified for that service (which may still be less than the subscribed capacity 606), whereas another process instance concludes at a condition 1104 in which the higher priority service's assigned capacity moves upward far enough to reach the subscribed capacity 606 specified for that service. These or other process instances may include a condition 1106 in which a lower priority service's assigned capacity moves downward enough to reach the minimum capacity 604 specified for that service.

During a higher priority service selecting step 802, a fault recovery manager 510 selects a service 512 which has a higher recovery priority than at least one other service in the environment 100, as a recipient of capacity that will be freed from the control of one or more other services. In general, the higher priority service will be selected at least in part because its capacity is below the minimum operating capacity 604 specified for the selected service. However, a service operating at or above its minimum capacity 604 may also be selected 802 to receive reallocated 836 capacity if the service is still below its subscribed capacity 606. In addition to the service's current capacity 518, minimum capacity 604, and subscribed capacity 606, and recovery priority 506, other selection criteria may be used, such as favoring a particular SLA, balancing reallocated capacity between multiple tenants, the period of time elapsed since the service was last at the desired capacity, or the amount of capacity needed and the recovery options, e.g., with other things being equal, recovering two services may be favored over recovering a single service when a given amount of capacity could do either. Relevant data for these other selection criteria may be part of the specification's other data 612, the service's capacity information, or both.

During a lower priority service choosing step 804, a fault recovery manager 510 chooses a service 512 which has a lower recovery priority than at least one other service in the environment 100, as a donor of capacity that will be reassigned to one or more other services. In general, the lower priority service will be selected at least in part because its capacity is above the minimum operating capacity 604 specified for the selected service. However, a lower priority service may also be driven by reallocation to a capacity that is below its minimum capacity 604, or even be fully terminated, to provide capacity for one or more higher priority services. In addition to the service's current capacity 518, minimum capacity 604, and recovery priority 506, other choice criteria may be used, such as disfavoring a particular SLA, balancing recovery donations between multiple tenants, or the amount of capacity needed and the recovery options, e.g., with other things being equal, reallocating capacity from multiple lower priority services without sacrificing their functionality by driving them below their minimums 604 may be favored over terminating a service to free the same amount of capacity. Relevant data for these other choice criteria may be part of the specification's other data 612, the service's capacity information, or both.

During a capacity reducing step 806, an embodiment reduces the capacity 130 of one or more services 512. This may be accomplished by killing 842 one or more instances 702 thereby reducing 808 the number 810 of instances driven by the service, by denying or throttling processor 110 usage, by denying or throttling network access, by terminating threads or computing processes, by fully terminating 846 the service, by other approaches, or by a combination of approaches.

During a capacity increasing step 812, an embodiment increases the capacity 130 of one or more services 512. This may be accomplished by starting 844 one or more instances 702 thereby increasing 814 the number 810 of instances driven by the service, by increasing processor 110 usage, by increasing network access, by starting threads or computing processes, by other approaches, or by a combination of approaches.

During a repeating step 816 an embodiment repeats a capacity reallocation sequence until a condition 818 occurs 820. In general, a condition 818 occurs when reallocation 836 brings a service up to a desired capacity (conditions 1102, 1104), or when reallocation will take a service below its minimum operational capacity (condition 1106). A "capacity reallocation sequence" is a sequence of steps that reallocates capacity from at least one service to at least one other service. As a few of the many possible examples, each of the following is a capacity reallocation sequence:

(a) reduce capacity of service A, then increase capacity of service B;
(b) reduce capacity of service A, then increase capacity of services B and C;
(c) reduce capacity of services A and B, then increase capacity of service C;
(d) reduce capacity of services A, B, and C, then increase capacity of service D;
(e) reduce capacity of services A, B, and C, then increase capacity of services D and E.

One capacity reallocation sequence may be followed immediately or later by another, e.g., sequence one: reduce capacity of service A to A's minimum, increase capacity of B by a corresponding amount; sequence two: reduce capacity of service C, increase capacity of B by a corresponding amount, thereby bringing B to the desired capacity.

During a deployment preventing step 822, an embodiment prevents additional services from deployment 826, in order to permit only the currently deployed services to use the scarce computational resources 704. This may be accomplished by having infrastructure software 126 deny requests for the creation of new services, or by preventing the infrastructure software 126 from receiving such requests, for example. Even so, a queue of the requests may be maintained. During a deployment allowing step 824, measures taken to prevent 822 deployment of additional services are suspended or terminated, and any queued deployment requests may be processed.

During an availability gap calculating step 828, an embodiment calculates one or more availability gaps 830 for services 512. The availability gap of a service is defined as the service's minimum operating capacity 604 minus the service's current capacity 518. For a service with a minimum operating capacity 604 of twenty working instances that currently has twelve working instances, the availability gap in terms of working instances is twenty minus twelve, that is, eight working instances.

Some embodiments favor closing 832 larger availability gaps over closing smaller ones, either in general or when repair priorities are within a predefined tolerance of one another. For example, suppose that terminating a lower priority service will free up ten working instances, suppose that service A with priority 1 has an availability gap of six and service B with priority 1 has an availability gap of eight. Then an embodiment may favor 832 reassigning 836 the capacity of eight freed instances to completely close the service B availability gap rather than reassigning from six freed instances to completely close the service A availability gap. If the favoring of larger closures extends over a range of repair priorities with a tolerance of one, then the freed instance capacity would also be assigned 836 to service B even when service A with priority 1 has the availability gap of six and service B with the lower (less urgent) priority 2 has the availability gap of eight.

During a service sorting step 834, an embodiment sorts services according to their respective availability gaps.

During a resource dedicating step 838, an embodiment dedicates resources 704 to a reserve 840. The resources generally include hardware resources, such as processors and memory, but software resources such as connections, licenses, descriptors, certificates, and the like may also be reserved.

During a deficit determining step 848, an embodiment determines whether a capacity deficit 850 exists for specified portion of the computing environment 100, e.g., a datacenter group, an availability zone, or a region, or for the environment 100 as a whole. A capacity deficit 850 exists if and only if the subscribed capacity of all services in the environment or specified environment portion exceeds the total current functional capacity of the environment or specified environment portion. For example, suppose a datacenter group provides capacity for ten thousand servers when there are no failures and holds services that are subscribed to utilize up to eight thousand of the ten thousand servers. If a fault knocks out a thousand servers, there is no capacity deficit because the remaining nine thousand servers still exceed the subscribed capacity of eight thousand servers. But if a fault knocks out four thousand servers, then only six thousand servers remain functional, and there is a capacity deficit of two thousand servers.

During an assigned capacity calculating step 852, an embodiment calculates the assigned capacity of a given service or of a group of services.

During a sending step 854 or a receiving step 856, part of an embodiment sends a capacity reallocation command 514 or receives a response 516 to such a command, respectively.

With the benefit of the teachings herein, one of skill may recognize that introducing a fault recovery manager system 502 into a cloud 100 also introduces risks that the fault recovery manager system 502 may be misused. Misuse of the fault recovery manager system 502 or related malicious activity, is denoted generally herein as rogue behavior. One example of rogue behavior would be transmission of capacity reallocation commands that should not be performed, and another would be performance of commands 514 that should not be performed, e.g., because they involve falsified identification of the fault recovery manager 510 or they command actions that are spurious or malicious. Another example of rogue behavior would be non-performance of commands 514 that should have been performed, e.g., tampering to favor one tenant over other tenants in a hidden manner that contradicts the priority specification 504 that is nominally controlling reallocation of scarce capacity. Rogue behavior may be detected automatically by looking for frequency spikes or other statistically significant departures from past behavior of services or tenants or fault recovery manager, or by assessing the impact of commands, for example. Some rogue behavior may also be detected manually by administrators 104 in the course of investigating the cause of an availability failure or a security lapse. Rogue behaviors may be reduced or avoided by authenticating the fault recovery manager 510 and the services 512 to one another, by securely limiting access to the recovery specification(s) 504, and by taking the same kind of strong measures to control updates to the fault recovery manager that are taken traditionally to control updates to the hypervisor and other IaaS infrastructure code.

Some examples provide or use a computing technology method for fault recovery management by a tenant or an infrastructure provider in a cloud computing environment 100 having computational resources 704 which support instances of computing services 512. The method includes selecting 802 a higher priority computing service which has a current number of working instances that is below a minimal availability threshold of the higher priority computing service, the higher priority computing service also having a repair priority; choosing 804 a lower priority computing service which has a repair priority that is lower than the higher priority computing service's repair priority, the lower priority computing service also having a current number of working instances that is above a minimal availability threshold of the lower priority computing service; reducing 808 the current number of working instances of the chosen lower priority computing service, thereby freeing for reassignment at least a portion of at least one computational resource of the cloud computing environment; increasing 814 the number of working instances of the higher priority computing service, thereby reassigning at least part of the freed computational resource; and repeating 816 at least the reducing and increasing steps, at least until one of the following conditions occurs 820: (i) the number of working instances of the higher priority computing service is no longer below the minimal availability threshold of the higher priority computing service, or (ii) further reducing would put the number of working instances of the lower priority computing service below the minimal availability threshold of the lower priority computing service.

In some examples, the cloud computing environment 100 includes a data center, each computing service either belongs to an infrastructure provider or else belongs to at least one tenant, and the method further includes preventing 822 deployment to the data center of any additional computing service of any one or more tenants until each computing service deployed in the data center is either terminated or suspended or has a number of working instances which is not below a minimal availability threshold of the computing service.

In some examples, the method further includes calculating 828 availability gaps for at least two computing services in the cloud computing environment; an availability gap of a computing service is calculated in this example as the minimal availability threshold of the computing service minus the current number of working instances of the computing service. Selecting 802 a higher priority computing service then includes favoring 832 selection of computing services with larger availability gaps over selection of computing services with smaller availability gaps, at least for a given repair priority.

In some examples, the method includes calculating 828 availability gaps for at least two computing services in the cloud computing environment, sorting 834 the at least two computing services according to their availability gaps and their repair priorities, and selecting 802 a higher priority computing service from among the sorted computing services.

In some examples, selecting 802, choosing 804, reducing 808 and increasing 814 are repeated until each computing service has at least a minimal availability number of working instances. For each computing service in the cloud computing environment, the number of working instances of the computing service is not below the minimal availability threshold of the computing service. Similar methods may include repeated capacity reduction 806 and capacity increases 812 in situations where capacity 130 is measured in terms other than the number of working instances.

In some examples, the cloud computing environment 100 has unassigned computational resources remaining after the number of working instances of each non-terminated and non-suspended computing service is not below the minimal availability threshold of the computing service, and the method further includes selecting 802 a highest priority computing service whose repair priority is at least at high as the repair priority of any other computing service, and increasing 814 the number of working instances (or other capacity measure) of the highest priority computing service, thereby reassigning at least part of the unassigned computational resources.

In some examples, the cloud computing environment 100 has unassigned computational resources remaining after the number of working instances of each non-terminated and non-suspended computing service is not below the minimal availability threshold of the computing service, and the method further includes at least one of the following: dedicating 838 at least a portion of the unassigned computational resources to a reserve, thereby providing a buffer against demand fluctuations or faults; or allowing 824 a previously prevented deployment of at least one additional computing service in the cloud computing environment, thereby assigning at least part of the unassigned computational resources.

In some examples, the selecting 802, choosing 804, reducing 808 and increasing 814 are repeated until no computing service has more than a minimal availability number of working instances, but at least one computing service still has less than a minimal availability number of working instances, and the method further includes: terminating 846 all working instances of a computing service whose repair priority is at least at low as the repair priority of any other computing service, and increasing 814 the number of working instances of at least one computing service which had less than the minimal availability number of working instances before the increasing.

More generally, in some examples, the selecting 802, choosing 804, reducing 806 and increasing 812 are repeated until no computing service has more than a minimal availability capacity, but at least one computing service still has less than a minimal availability capacity, and the method further includes: terminating 846 a computing service whose repair priority is at least at low as the repair priority of any other computing service, and increasing 812 the capacity of at least one computing service which had less than the minimal availability capacity before the increasing. The other methods taught herein likewise generalize from working instances to other measures of capacity.

Configured Media

Some embodiments include a configured computer-readable storage medium 112. Medium 112 may include disks (magnetic, optical, or otherwise), RAM, EEPROMS or other ROMs, and/or other configurable memory, including in particular computer-readable media (which are not mere propagated signals). The storage medium which is configured may be in particular a removable storage medium 114 such as a CD, DVD, or flash memory. A general-purpose memory, which may be removable or not, and may be volatile or not, can be configured into an embodiment using items such as fault recovery commands 514, command responses 516, recovery priority specifications 504, and fault recovery manager software 510, in the form of data 118 and instructions 116, read from a removable medium 114 and/or another source such as a network connection, to form a configured medium. The configured medium 112 is capable of causing a computer system to perform technical process steps for reallocating scarce capacity 130 as disclosed herein. The Figures thus help illustrate configured storage media embodiments and process embodiments, as well as system and process embodiments. In particular, any of the process steps illustrated in FIG. 8, FIG. 11, or otherwise taught herein, may be used to help configure a storage medium to form a configured medium embodiment.

Some examples use or provide a computer-readable storage medium configured with executable instructions to perform a method for fault recovery management in a cloud computing environment including at least one availability zone having computational resources which support computing services. The method includes: determining 848 that a current total functioning capacity of the availability zone is less than a total subscribed capacity of all the computing services in the availability zone; selecting 802 a higher priority computing service which has a current assigned capacity that is below a minimal availability threshold of the higher priority computing service, the higher priority computing service also having a repair priority; choosing 804 a lower priority computing service which has a repair priority that is lower than the higher priority computing service's repair priority, the lower priority computing service also having a current assigned capacity that is above a minimal availability threshold of the lower priority computing service; reducing 806 the current assigned capacity of the chosen lower priority computing service, thereby freeing for reassignment at least a portion of at least one computational resource of the cloud computing environment; increasing 812 the assigned capacity of the higher priority computing service, thereby reassigning at least part of the freed computational resource; and repeating 816 at least the reducing and increasing at least until one of the following conditions occurs 820: (i) the assigned capacity of the higher priority computing service is no longer below the minimal availability threshold of the higher priority computing service, (ii) the assigned capacity of the higher priority computing service is at least a subscribed capacity of the higher priority computing service, or (iii) further reducing would put the assigned capacity of the lower priority computing service below the minimal availability threshold of the lower priority computing service.

In some examples, each computing service either belongs to an infrastructure provider or else belongs to at least one tenant, and the method further includes preventing 822 deployment to the availability zone 252 of any additional computing service of any one or more tenants until each computing service deployed in the availability zone is either terminated or suspended or has an assigned capacity which is not below a minimal availability threshold of the computing service.

In some examples, assigned capacity 130 for a given computing service is calculated 852 based on at least one of the following: a number of working instances of the computing service, a weighted sum of working instances of the computing service, or allocation of a particular kind of computational resource to the computing service, e.g., memory size, processing power, bandwidth, or the like.

In some examples, the method includes calculating 828 availability gaps for at least two computing services in the cloud computing environment, sorting 834 the at least two computing services according to their availability gaps and their repair priorities, and selecting 802 a higher priority computing service from among the sorted computing services.

In some examples, the selecting, choosing, reducing and increasing are repeated until each computing service has at least a minimal availability, in that for each computing service in the cloud computing environment the assigned capacity of the computing service is not below the minimal availability threshold of the computing service.

In some examples, the cloud computing environment has unassigned computational resources remaining after the assigned capacity of each non-terminated and non-suspended computing service is not below the minimal availability threshold of the computing service, and the method includes at least two of the following: selecting 802 a highest priority computing service whose repair priority is at least at high as the repair priority of any other computing service, and increasing the assigned capacity of the highest priority computing service, thereby reassigning at least part of the unassigned computational resources; dedicating 838 at least a portion of the unassigned computational resources to a reserve, thereby providing a buffer against demand fluctuations or faults; or allowing 824 a previously prevented deployment of at least one additional computing service in the cloud computing environment, thereby assigning at least part of the unassigned computational resources.

In some examples, selecting, choosing, reducing and increasing are repeated until no computing service has more than a minimal availability assigned capacity, but at least one computing service still has less than a minimal availability assigned capacity, and the method includes fully terminating 846 a computing service whose repair priority is at least at low as the repair priority of any other computing service, and increasing 812 the assigned capacity of at least one computing service which had less than the minimal availability assigned capacity before the increasing.

Regional Fault Recovery Manager

Figure 9:
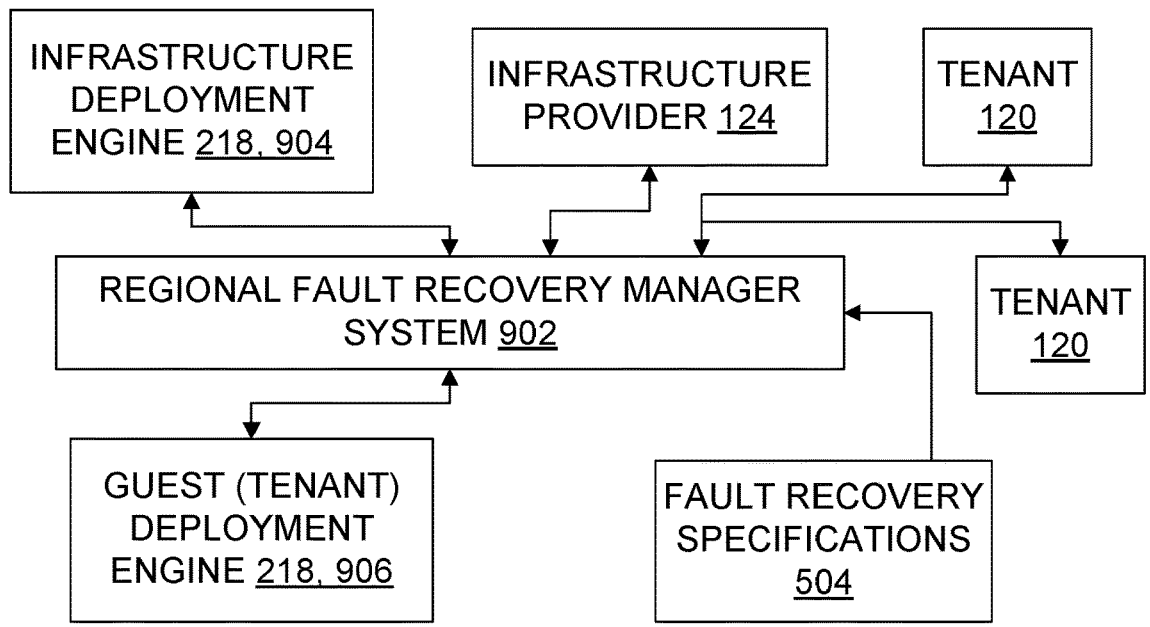
FIG. 9 is a data flow diagram illustrating aspects of an architecture which includes a fault recovery manager that coordinates assignment of computational resources in a region or other portion of a multi-tenant cloud.

FIG. 9 illustrates a cloud environment 100 which includes a regional fault recovery manager system 902. The regional fault recovery manager system 902 may operate in the manner of a fault recovery manager system 502 as discussed herein, but is localized to focus on one region 250 of the cloud environment 100; fault recovery reallocations in other regions are managed by other regional fault recovery manager instances located in those other regions. Some of the other regions may also lack any regional fault recovery manager, so the fault recovery in those regions is handled (if at all) in a traditional manner without the benefit of fault recovery management as taught herein.

Rather than using traditional ad hoc approaches, some fault recovery management approaches taught herein provide and use a declarative statement of recovery policies so that an underlying platform has guidance for reallocation decisions. Some policies 504 include one or more of the following:

(a) The number 602 of availability zones required during normal operation, and the minimum acceptable set 604 required for the service to be considered operational during the loss of an availability zone.

(b) Whether or not the service needs to be returned to its target instance count 606, and if not, what is the minimum number 604 needed to be functional. The load a service is presented with may or may not be related to the capacity of the campus it is in. If it is related, then it may reasonably operate with fewer active instances, until that lost capacity is restored.

(c) A repair priority 506. This can be a request and business driven policy item that determines the relative importance of repairing a service back to its minimum functional number. With this in place, the platform can determine which services are more important to restore, and it can determine the utilization point where new services cannot be deployed 826 to a campus and retain the overall availability zone resilience. The "availability zone resilience" is the ability of the availability zone to restore user services despite atypical hardware failures. It can be measured as a function of availability over time.

Note that these policies 504 are in addition to the normal repair policies, giving the user a single coherent way to describe full availability and the path to partial recovery and degraded operation.

To see how this works, consider an example which starts with a 4 DC campus, 87% utilization, and services that span 1, 2, or 3 of the DCs. One of the DCs fully fails. At this point the campus is oversubscribed by at least 12%, and preferably closer to 25%. That is, assume a 4 DC campus in which each DC provides 25% of total normal capacity. With one DC down, that leaves 3 DCs providing 3*25%=75% of total normal capacity, so at 87% utilization, the campus is oversubscribed by 87%−75%=12% of total normal capacity if there is no reserve set aside. If we give each of the three DCs a 4% reserve, then they would be providing 3*(25%−4%) =3*21%=63% of total normal capacity, so at 87% utilization, the campus is oversubscribed by 87%−63%=24% of total normal capacity. The example uses a normal reserve of 13%, and shows that one would need to set aside a further 12% to be able to ride through a DC loss, or else deal with being underwater.

In some embodiments, not limited to those in FIG. 9, recovery can proceed as follows.

First, stop 822 all new deployments into that campus. Take no new load ahead of repairing the currently deployed applications.

Next, order 834 every application by its repair priority and how much over or under it is from its minimum functional instance number. This can be done by sorting by repair priority first, and then sorting—within each repair priority— by distance from the minimum functional instance number (i.e., availability gap 830). Alternately, it may include sorting first by distance from the minimum functional instance number and then—within each distance—sorting by repair priority. In some situations every service has the same repair priority; this is a degenerate case that can be handled by the same procedure.

While there are services below the minimum, first reduce 808 the instances of the other services to the minimum, starting from the lowest priority. As capacity becomes available, the highest priority services that are under target are brought up 814 to their minimum.

Once all services are at their minimum, if there is capacity left, the platform could begin adding instances back toward full capacity 606, starting from the highest repair priority. Or it could choose to not do that and leave the spare capacity open for new business, after accounting for how much capacity would remain available once the capacity is restored. Or it could dedicate 838 specified amounts of capacity to reserve. Or a mixture of these could be done.

There could be scenarios where not every service is taken down to its minimum but enough capacity has nonetheless been reallocated, by killing some lower priority instances and starting some higher priority instances, to bring everyone at or above their minimums. Indeed, it may often occur that not all services will be taken to their minimum.

On the other hand, if there is not capacity left, begin fully terminating 846 services, starting from the lowest priority, until all running services are brought back to their minimum values. "Fully terminating" a service means killing all of its instances.

This reallocation 1108 of available capacity from lower priority services to higher priority services could be done in various ways, e.g., (a) kill a low priority instance, start a high priority instance, and repeat, or (b) kill M low priority instances, start M high priority instances, and repeat, or (c) kill M low priority instances, start N high priority instances, with N<>M, and repeat, for example. The higher priority services may not be the same size (for instance, a large VM vs a small VM), so it may take more or less than one low priority service to create space. One can also work out how much space or other capacity is needed, and then group the operations to do M at a time to get everyone back as quickly as possible.

As capacity is brought back, begin restoring applications to their full target count 606, starting from the highest priority applications.

If one takes into account the number of availability zones needed during degraded operation and the minimum target count, one variation is that the number of instances needed in a particular DC may rise during the capacity loss. Those instances are acquired according to the procedure above. But when the capacity is restored, then the additional instances in the other DCs will be stopped and moved back to the newly restored DC.

Again, with these policies in place a service owner can describe in one place, and in one set of guidelines, what to do when a node fails, a rack fails, and so on, up through very large failures that exhaust normal recovery mechanisms.

Returning to the illustrated cloud environment 100 of FIG. 9, one deployment engine 218 is controlled and used by an infrastructure provider and hence designated at 904 as an infrastructure deployment engine, and another deployment engine 218 is controlled and used by a tenant (a.k.a. guest) and hence designated at 906 as a guest deployment engine. In some examples, the regional fault recovery manager system 902 coordinates allocations of infrastructure capacity otherwise governed by a public cloud and application capacity otherwise governed by a tenant. These two types of capacity could be managed in part by different deployment engines, with different availability and recovery specifications.

In some cases, a fault recovery manager may be implemented in a fabric 312, e.g., as part of a fabric controller. Nodes leased from the fabric 312 may implement allocation, goal state driving, multi-tenancy, health monitoring, repairs and deployment at the data level within the leased nodes. The tenant nodes may have their own controller inside them that has its own view of node health and its own repair state machine, for example. Thus, the fabric controller and the tenant node's own controller may compete to manage the same set of nodes. In such cases, the fault recovery manager may include a management role (MR) which operates as taught herein. In particular, the fault recovery MR may give the tenant's own controller facts that the fabric controller has regarding the tenant's performance. Depending on a privilege level of the tenant, the MR may let the tenant decide what to do in response to an availability gap, or may at least give the tenant information to help the tenant orchestrate actions within the tenant node.

Clouds, Regions, Datacenters in a Hierarchy

Figure 10:
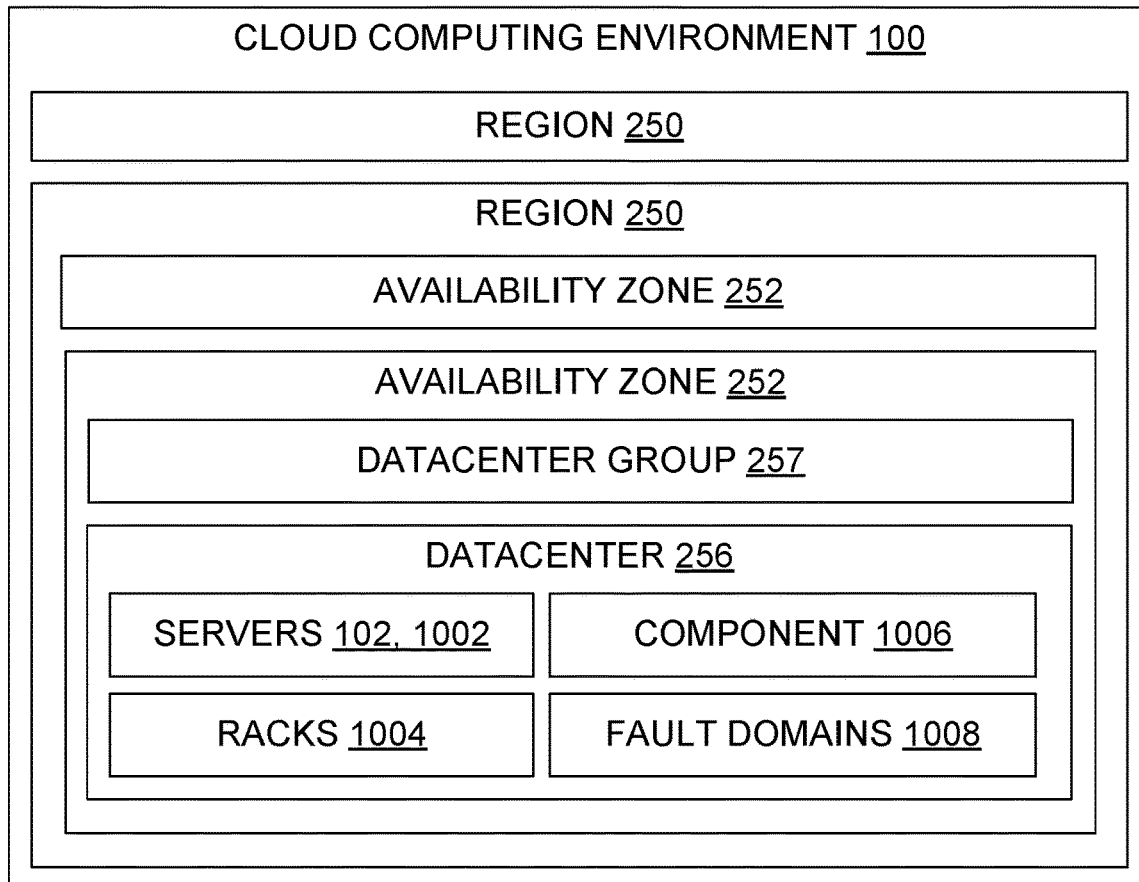
FIG. 10 is a block diagram illustrating a hierarchy of regions, availability zones, datacenters, and other items in a cloud computing environment.

FIG. 10 further illustrates a relationship between regions and clouds in some implementations. The illustrated cloud 100 includes two regions 250, which are defined by the cloud IaaS provider. A region 250 typically covers a relatively large geographic area, such that a tornado, hurricane, earthquake, flood, wildfire, or similar natural disaster does not span the entire region. A geography (not shown) such as a country or union of countries often contains one or two regions, but that depends on the capabilities of the IaaS provider. At the time of writing, for instance, Microsoft Azure® IaaS services recognized eight regions in the United States (Central US, East US, East US 2, US Gov Iowa, US Gov Virginia, North Central US, South Central US, West US) (mark of Microsoft Corporation), and Amazon AWS® IaaS services recognized four regions in the United States (us-east-1, us-west-1, us-west-2, GovCloud) (mark of Amazon Technologies, Inc.).

As illustrated, a region may include one or more availability zones 252. Different IaaS providers may define availability zones differently, but in general availability zones are smaller than regions, are larger than an individual datacenter 256, and are physically isolated from one another by at least ten kilometers. Availability zones may be connected in some cases by a network which has low-enough latency to support synchronous replication for all tenant workloads. Availability zones contain one or more datacenters 256; a datacenter may also reside directly within a region with no intervening availability zone, in some configurations.

A datacenter 256 (a.k.a. "data center" with a blank space) is a facility which houses physical computers, e.g., servers 1002, and other hardware components 1006, e.g., racks 1004, power transmission lines, network transmission lines, etc. The computers in a given datacenter typically share some facility-level infrastructure components, such as cooling equipment, a connection to an electric power grid, a backup source of electric power, and/or a surrounding fence and other physical security measures. Typically, all of the computers 102 in a datacenter are owned by the same IaaS provider.

Fault domains 1008 are logical units of hardware failure, typically based on single points of failure. For example, when a failure of a power supply for a rack will bring down every server in the rack, an IaaS provider may group each rack of servers into its own fault domain.

Some Additional Combinations and Variations

Any of these combinations of code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the medium combinations and variants describe above.

CONCLUSION

Although particular embodiments are expressly illustrated and described herein as processes, as configured media, or as systems, it will be appreciated that discussion of one type of embodiment also generally extends to other embodiment types. For instance, the descriptions of processes in connection with FIGS. 8 and 11 also help describe configured media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Those of skill will understand that implementation details may pertain to specific code, such as specific APIs, specific fields, and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims and the abstract, as filed, are part of the specification.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A computing technology method for fault recovery management by a tenant or an infrastructure provider in a cloud computing environment having computational resources which support instances of computing services, the method comprising:
    using at least one declarative statement in a recovery policy to specify at least two computing service repair priorities;
    selecting a higher priority computing service which has a current number of working instances that is below a minimal availability threshold of the higher priority computing service, the higher priority computing service also having a repair priority which is among the computing service repair priorities specified in the recovery policy;
    choosing a lower priority computing service which has a repair priority that is lower than the higher priority computing service's repair priority, the lower priority being among the computing service repair priorities specified in the recovery policy, the lower priority computing service also having a current number of working instances that is above a minimal availability threshold of the lower priority computing service;
    reducing the current number of working instances of the chosen lower priority computing service, thereby freeing for reassignment at least a portion of at least one computational resource of the cloud computing environment;
    increasing the number of working instances of the higher priority computing service, thereby reassigning at least part of the freed computational resource; and
    repeating at least said reducing and increasing at least until one of the following conditions occurs: (i) the number of working instances of the higher priority computing service is no longer below the minimal availability threshold of the higher priority computing service, or (ii) further reducing would put the number of working instances of the lower priority computing service below the minimal availability threshold of the lower priority computing service.

2. The method of claim 1, wherein the method comprises reading at least two of the following declarative statements in a recovery policy:
    a statement describing what to do when a node fails;
    a statement describing what to do when a rack fails;
    a statement describing what to do when a fault domain fails;
    a statement describing what to do when a datacenter fails;
    a statement describing what to do when a datacenter group fails;
    a statement describing what to do when an availability zone fails; or
    a statement describing what to do when a region fails.

3. The method of claim 2, wherein the method comprises reading at least three of the listed recovery policy declarative statements.

4. The method of claim 1, wherein the method comprises a fault recovery manager communicating with infrastructure software rather than communicating directly with the computing services.

5. The method of claim 1, wherein the minimal availability threshold of the higher priority computing service includes the computing service having a number of working instances which is at least one hundred.

6. The method of claim 1, wherein the method further comprises authenticating a fault recovery manager and at least one of the computing services to one another, thereby reducing a risk of rogue behavior.

7. The method of claim 1, wherein the method further comprises taking one or more measures to securely control updates to a fault recovery manager, thereby reducing a risk of rogue behavior.

8. The method of claim 1, wherein the method further comprises detecting at least one of the following kinds of rogue behavior:
- a transmission of a capacity reallocation command which involves falsified identification of a fault recovery manager;
- a transmission of a capacity reallocation command which commands a spurious action;
- a transmission of a capacity reallocation command which commands a malicious action;
- a performance of a capacity reallocation command which involves falsified identification of a fault recovery manager;
- a performance of a capacity reallocation command which commands a spurious action;
- a performance of a capacity reallocation command which commands a malicious action;
- a non-performance of an authorized capacity reallocation command; or
- a tampering with capacity reallocation to favor one tenant over other tenants.

9. A computer-readable storage medium configured with executable instructions to perform a method for fault recovery management in a cloud computing environment including at least one region having computational resources which support computing services, the method comprising:
- determining that a current total functioning capacity of the region is less than a total subscribed capacity of all the computing services in the region;
- selecting a higher priority computing service which has a current assigned capacity that is below a minimal availability threshold of the higher priority computing service, the higher priority computing service also having a repair priority;
- choosing a lower priority computing service which has a repair priority that is lower than the higher priority computing service's repair priority, the lower priority computing service also having a current assigned capacity that is above a minimal availability threshold of the lower priority computing service;
- reducing the current assigned capacity of the chosen lower priority computing service, thereby freeing for reassignment at least a portion of at least one computational resource of the cloud computing environment;
- increasing the assigned capacity of the higher priority computing service, thereby reassigning at least part of the freed computational resource; and
- repeating at least said reducing and increasing at least until one of the following conditions occurs: (i) the assigned capacity of the higher priority computing service is no longer below the minimal availability threshold of the higher priority computing service, (ii) the assigned capacity of the higher priority computing service is at least a subscribed capacity of the higher priority computing service, or (iii) further reducing would put the assigned capacity of the lower priority computing service below the minimal availability threshold of the lower priority computing service.

10. The computer-readable storage medium of claim 9, wherein the method further comprises avoiding application latency from service reductions by favoring a specific hosting location which is declared in a service definition recovery policy.

11. The computer-readable storage medium of claim 9, wherein at least one of the computing services is provided as part of an infrastructure-as-a-service offering.

12. The computer-readable storage medium of claim 9, wherein at least one of the computing services is provided as part of a platform-as-a-service offering.

13. The computer-readable storage medium of claim 9, wherein at least one of the computing services is provided as part of a software-as-a-service offering.

14. The computer-readable storage medium of claim 9, wherein said selecting, choosing, reducing and increasing are repeated until each computing service has at least a minimal availability, in that for each computing service in the cloud computing environment the assigned capacity of the computing service is not below the minimal availability threshold of the computing service, and wherein the cloud computing environment has unassigned computational resources remaining after the assigned capacity of each non-terminated and non-suspended computing service is not below the minimal availability threshold of the computing service, and the method further comprises dedicating at least a portion of the unassigned computational resources to a reserve, thereby providing a buffer against demand fluctuations or faults.

15. The computer-readable storage medium of claim 9, wherein said selecting, choosing, reducing and increasing are repeated until each computing service has at least a minimal availability, in that for each computing service in the cloud computing environment the assigned capacity of the computing service is not below the minimal availability threshold of the computing service, and wherein the cloud computing environment has unassigned computational resources remaining after the assigned capacity of each non-terminated and non-suspended computing service is not below the minimal availability threshold of the computing service, and the method further comprises allowing a previously prevented deployment of at least one additional computing service in the cloud computing environment, thereby assigning at least part of the unassigned computational resources.

16. A system for fault recovery management in a cloud computing environment having computational resources which support computing services, the system comprising:
- at least one processor;
- a memory in operable communication with the processor;
- fault recovery management software residing in the memory and executable with the processor to perform a method which reassigns capacity from lower priority computing services to higher priority computing services without reducing any computing service below a minimal availability unless a situation occurs in which at least one computing service still has less than minimal availability and no computing service has more than minimal availability, in which situation the fault recovery management software fully terminates a lower priority computing service whose priority is lower than the priority of a higher priority computing service, thereby allowing reassignment to the higher priority computing service of at least a portion of computational resources that were freed by said termination; and
- wherein the fault recovery management software determines a recovery operation for a computing service at least in part by reading a specification which specifies at least one of the following policy items:
a number of availability zones used during normal operation of the computing service;
a minimum acceptable set of assigned computational resources for the computing service to be considered operational during a loss of an availability zone;
an indication of whether the computing service shall be returned to a subscribed capacity, and if return to the subscribed capacity is optional then an indication of the minimal capacity for the computing service to be functional;
a repair priority of the computing service relative to other computing services;
one or more criteria to use in addition to service capacity when selecting a service to receive reallocated capacity when the service is at or above its minimum capacity but below its subscribed capacity;
one or more criteria to use in addition to service capacity when selecting a service from which to reallocate capacity to a higher priority service; or
what recovery operation to take when an item at a given level in a hierarchy fails, where the hierarchy includes at least regions and data centers.

17. The system of claim 16, wherein the fault recovery management software determines a recovery operation for a computing service at least in part by reading a specification which specifies at least three of the listed policy items.

18. The system of claim 16, wherein the fault recovery management software determines a recovery operation for a computing service at least in part by reading a specification which specifies at least one of the following criteria to use in addition to service capacity when selecting a service to receive reallocated capacity when the service is at or above its minimum capacity but below its subscribed capacity:
favoring a particular service level agreement;
balancing reallocated capacity between multiple tenants;
a period of time elapsed since the computing service was last at its subscribed capacity; or
favoring recovering two computing services over recovering a single computing service when a given amount of capacity could do either.

19. The system of claim 16, wherein the fault recovery management software determines a recovery operation for a computing service at least in part by reading a specification which specifies at least one of the following criteria to use in addition to service capacity when selecting a service from which to reallocate capacity to a higher priority service:
disfavoring a particular service level agreement;
balancing recovery donations between multiple tenants; or
favoring reallocating capacity from multiple lower priority computing services without sacrificing their functionality by driving them below their minimums, over terminating a computing service to free the same amount of capacity.

20. The system of claim 16, wherein the fault recovery management software determines a recovery operation for a computing service at least in part by reading a specification which specifies what recovery operation to take when an item at a given level in a hierarchy fails, where the hierarchy includes at least regions, availability zones, and data centers.

* * * * *